(12) United States Patent
Ishibashi

(10) Patent No.: US 8,565,950 B2
(45) Date of Patent: Oct. 22, 2013

(54) ELECTRIC VEHICLE, MANAGEMENT APPARATUS, AND DRIVE MANAGEMENT METHOD

(75) Inventor: Yoshihito Ishibashi, Tokyo (JP)

(73) Assignee: Sony Corporation, Tokyo (JP)

( * ) Notice: Subject to any disclaimer, the term of this patent is extended or adjusted under 35 U.S.C. 154(b) by 354 days.

(21) Appl. No.: 12/908,342

(22) Filed: Oct. 20, 2010

(65) Prior Publication Data
US 2011/0144844 A1    Jun. 16, 2011

(30) Foreign Application Priority Data
Dec. 16, 2009    (JP) .................................. 2009-285442

(51) Int. Cl.
*G07F 19/00*    (2006.01)
*H02J 7/00*    (2006.01)

(52) U.S. Cl.
USPC .......................................... 701/22; 701/29.6

(58) Field of Classification Search
USPC .................... 701/22, 36, 99, 29.3, 29.6, 32.7; 320/109; 429/61; 705/17, 18, 412
See application file for complete search history.

(56) References Cited

U.S. PATENT DOCUMENTS

| | | | | |
|---|---|---|---|---|
| 6,185,487 | B1* | 2/2001 | Kondo et al. | 701/22 |
| 6,975,997 | B1* | 12/2005 | Murakami et al. | 705/5 |
| 7,181,409 | B1* | 2/2007 | Murakami et al. | 705/5 |
| 8,294,420 | B2* | 10/2012 | Kocher | 320/109 |
| 2009/0043450 | A1* | 2/2009 | Tonegawa et al. | 701/36 |
| 2010/0225475 | A1* | 9/2010 | Karch et al. | 340/540 |
| 2010/0237985 | A1* | 9/2010 | Landau-Holdsworth et al. | 340/5.8 |
| 2011/0022222 | A1* | 1/2011 | Tonegawa | 700/232 |

FOREIGN PATENT DOCUMENTS

JP    2007-228695    9/2007
JP    2007-252016    9/2007

* cited by examiner

*Primary Examiner* — Khoi Tran
*Assistant Examiner* — Jason Holloway
(74) *Attorney, Agent, or Firm* — Oblon, Spivak, McClelland, Maier & Neustadt, L.L.P.

(57) ABSTRACT

There is provided an electric vehicle including a battery that stores power, a connection unit that is to be connected a charger that communicates with a management device capable of reading identification information specific to each electric vehicle from a security token brought into proximity or in contact, a driving prohibition unit that prohibits operation of a driving mechanism in a case predetermined processing relating to charging of the battery is started after the charger is connected to the connection unit, and a driving permission unit that permits operation of the driving mechanism after the identification information of the electric vehicle is read from the security token by the management device.

3 Claims, 14 Drawing Sheets

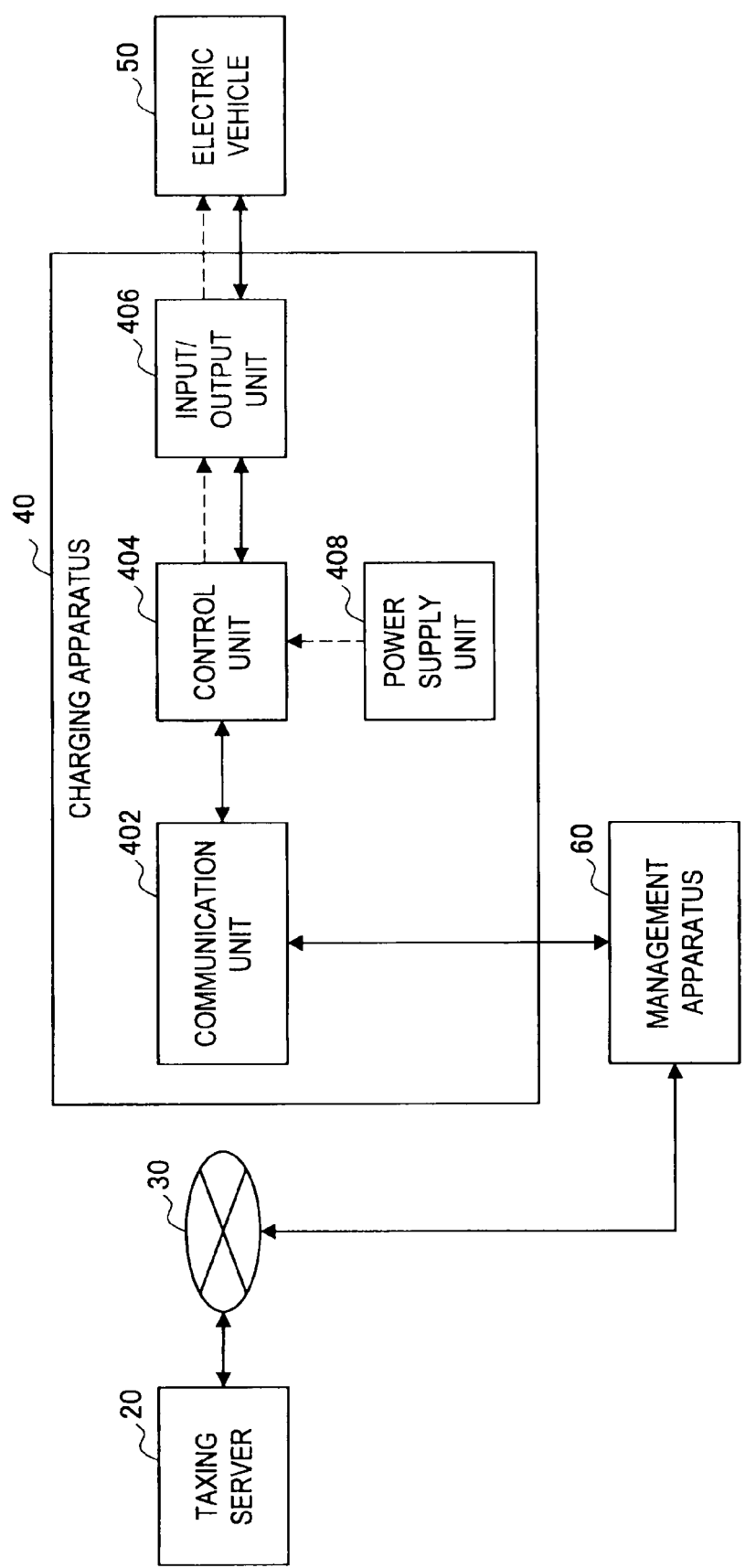

MODIFIED EXAMPLE: SYSTEM CONFIGURATION

MODIFIED EXAMPLE OF SYSTEM CONFIGURATION

ELECTRIC VEHICLE, MANAGEMENT APPARATUS, AND DRIVE MANAGEMENT METHOD

BACKGROUND OF THE INVENTION

1. Field of the Invention

The present invention relates to an electric vehicle, a management apparatus, and a drive management method.

2. Description of the Related Art

In recent years, a technology called a smart grid has been gaining attention. The smart grid is a technological framework to realize efficient power usage by constructing a new transmission network having a communication channel along with the transmission network and using this intelligent transmission network. The background idea of the smart grid is to realize efficient management of power use, swift handling of an incident when such an incident occurs, remote control of power use, distributed power generation using power generation facilities outside the control of a power company, or charging management of an electric vehicle. Particularly, effective utilization of in-house power generating stations using renewable energy by ordinary households or operators other than power companies and charging management of various electric vehicles typically including electric cars have been attracting considerable attention. Incidentally, renewable energy is energy generated without using fossil fuel.

Power generated by ordinary households or operators other than power companies is used by power generation operators. Remaining power after use by the power generation operators is currently purchased by power companies. However, purchasing power supplied from power generation facilities outside the control of a power company is a heavy burden to the power company. For example, amount of power supplied from photovoltaic power generation facilities depends on the weather. Moreover, amount of power supplied from in-house power generating stations of ordinary households depends on power use of ordinary households that largely changes day by day. Thus, it is difficult for power companies to receive stable power supply from power generation facilities outside the control of power companies. For the above reason, it may be difficult for power companies to purchase power in the future.

Thus, a home battery initiative that uses power generated by power generation facilities outside the control of power companies after temporarily storing the power in batteries has recently been gaining attention. For example, a method of using power generated by photovoltaic power generation facilities by storing such power in batteries and making up for shortages in the night or when the weather is bad is considered. Furthermore, a method of limiting amount of power received from a power company in accordance with the battery storage amount or using power stored in batteries in the daytime when power rates are higher by storing power, in batteries, supplied by a power company in the night when power rates are lower are considered. Also, batteries can store power as DC, which makes DC/AC conversion or AC/DC conversion during transmission unnecessary so that losses during conversion can be reduced.

Thus, various expectations regarding power management mingle with one another amid the smart grid initiative. To realize such power management, the smart grid initiative is premised on having a communication channel along with a transmission network. That is, exchanging information about power management by using this intelligent transmission network is assumed. However, in a region where a communication infrastructure is already built, instead of using a transmission network as a communication channel, information about power management may be exchanged by using a network constructed by the deployed communication infrastructure. That is, what is important in the smart grid initiative is how to efficiently manage power generation facilities and storage facilities that are not uniformly managed.

The power management in the smart grid initiative includes, as described above, charging management of an electric vehicle. A typical example of the electric vehicle (EV) is an electric car. However, in addition to the electric cars, for example, electric bicycles, electric buses, electric freight cars, electric ships, and electric planes can also be considered as the electric vehicles. Naturally, the electric vehicles have accumulators or capacitors (hereinafter, denoted as batteries) mounted thereon. Motor-driven movable bodies are driven using power stored in the batteries.

A battery means any unit capable of storing energy in some form and discharging energy again. Typical examples thereof include accumulators and capacitors.

As the accumulator, for example, a general accumulator such as a lithium-ion battery, nickel-metal hydride battery, lead storage battery, and NAS battery can be given as examples. Moreover, in addition to these general accumulators that can currently be used, any accumulator that will be available in the future can also be used as the accumulator. On the other hand, as the capacitor, for example, a general capacitor such as a field-effect capacitor and ceramic capacitor or a large-capacity electric double layer capacitor under development in recent years can be used.

As a system that stores electrical energy in a re-dischargeable form, a pumped storage generation system can be given as an example. The pumped storage generation system converts electrical energy into potential energy for storage. Then, when re-discharging electrical energy, the potential energy is used to generate power. For example, water is pumped up to a higher place using electrical energy and when discharging electrical energy, hydraulic power generation is carried out using energy that causes the water to fall. Thus, a system that converts electrical energy into potential energy can also be considered as a kind of battery.

As a mechanism to store electrical energy in a re-dischargeable form, a structure that uses electrolysis of water is known. In this mechanism, when storing electrical energy, electrolysis of water is carried out using electrical energy and generated hydrogen is stored. Then, when re-discharging electrical energy, the stored hydrogen is burnt to generate power or the stored hydrogen is used to generate power using fuel cells. Such a mechanism can also be considered as a kind of battery.

As described above, all structures capable of temporarily storing electrical energy by some method and providing electrical energy again can be considered as a kind of battery.

Now, charging facilities set up in ordinary households or charging facilities set up by various operators are used to charge batteries of an electric vehicle. For charging management of electric vehicles from charging facilities, a mechanism that allows the charging facilities to identify each electric vehicle becomes necessary.

Regarding the mechanism of carrying out charging management of electric vehicles from charging facilities, JP-A-2007-228695 discloses a technology of performing authentication of an electric vehicle (car) by using information of an ETC card. The technology of this patent document is for a charging facility to acquire information of an ETC card from an electric vehicle and identify the user of the charging at the time of starting or ending power feeding from the charging facility to the electric vehicle to thereby prevent stealing of power. Furthermore, JP-A-2007-252016 discloses a technology for an electric vehicle (car) to read an ID code from a transponder key of an immobilizer system, authenticate the same, and transmit the authentication result to a charging facility. A transponder key is a key provided with a small electronic communication chip.

SUMMARY OF THE INVENTION

By adopting the authentication technologies disclosed in the patent documents described above, a charging facility is enabled to correctly recognize an electric vehicle. However, the technologies disclosed in the patent documents described above are technologies for a charging facility to recognize an electric vehicle, and it is difficult to extend the technologies to a technology of directly or indirectly managing an electric vehicle from outside the charging facility. To provide an additional service, in addition to a charging service, to the user of an electric vehicle at the time of charging, a mechanism that is capable of carrying out more advanced management of the electric vehicle by a charging facility or from outside of the charging facility has to be constructed.

For example, in a case of providing the charging service at a parking lot of a retail store, a mechanism may become necessary that allows a charging fee to be paid inside the store by using an IC card or the like. Also, a mechanism of providing, to a user who has shopped in the store, a charging fee discount service according to a total amount of the shopping may become necessary. Furthermore, a mechanism of allowing a store to act as a proxy and collect tax imposed according to watt-hours charged to an electric vehicle may become necessary. To realize these mechanisms, it becomes necessary to think of a new mechanism of securely managing identification information for identifying an electric vehicle and making the electric vehicle, a charging facility and an external device (hereinafter, management device) used for providing a service cooperate with each other by using the identification information.

During the study of such a mechanism, the inventor of the present invention has devised a mechanism of promoting use of a store during charging by using identification information unique to an electric vehicle stored in a transponder key, a non-contact IC card or the like (hereinafter, security token) and carrying out drive management of the electric vehicle. In light of the foregoing, it is desirable to provide an electric vehicle, a management apparatus, and a drive management method, which are new and improved, and which are capable of encouraging a user of an electric vehicle to inevitably go to the installation location of the management device during charging, by using identification information specific to the electric vehicle stored in a security token.

According to an embodiment of the present invention, there is provided an electric vehicle which includes a battery that stores power, a connection unit that is to be connected to a charger that communicates with a management device capable of reading identification information specific to each electric vehicle from a security token brought into proximity or in contact, a driving prohibition unit that prohibits operation of a driving mechanism in a case where predetermined processing relating to charging of the battery is started after the charger is connected to the connection unit, and a driving permission unit that permits operation of the driving mechanism after the identification information of the electric vehicle is read from the security token by the management device.

The charger may start charging the battery according to a charging permission after the identification information of the electric vehicle is read from the security token and the charging permission for permitting charging is notified based on the identification information from the management device to the charger connected to the connection unit.

The electric vehicle may further include an information transmission unit that transmits, when the battery is to be charged, the identification information of the electric vehicle and information about charged watt-hours to a taxing server that imposes a tax amount in accordance with charged watt-hours, and an information reception unit that receives, from the taxing server, a completion notification of taxation processing performed based on the identification information of the electric vehicle and the information about charged watt-hours transmitted by the information transmission unit. The driving permission unit may permit operation of the driving mechanism after the completion notification is received by the information reception unit.

The electric vehicle may further include an authentication processing unit that performs, after authentication information for performing authentication processing with the electric vehicle corresponding to the identification information of the electric vehicle is read from the security token by the management device and the authentication information is provided from the management device to the charger, the authentication processing with the charger based on the authentication information. The information transmission unit and the driving prohibition unit respectively start processing in a case authentication by the authentication processing unit succeeded.

The security token may control a time during which reading is possible in such a way that the authentication information is not successively read with a time interval less than a predetermined time.

According to another embodiment of the present invention, there is provided a management apparatus which includes a read unit that reads information from a security token brought into proximity or in contact, an identification information acquisition unit that acquires identification information specific to each electric vehicle by using the read unit, and a driving permission notification unit that notifies the electric vehicle corresponding to the identification information acquired by the identification information acquisition unit, among the electric vehicles having a function of prohibiting operation of a driving mechanism in a case predetermined processing relating to charging of a battery is started and operation of whose driving mechanisms has been prohibited by the function, of a driving permission for permitting operation of the driving mechanism. The electric vehicle permits operation of the driving mechanism after the driving permission is notified by the driving permission notification unit.

The management apparatus may further include a charging permission notification unit that notifies a charger for supplying power to a connected electric vehicle of a charging permission for permitting charging of the battery of the electric vehicle corresponding to the identification information acquired by the identification information acquisition unit. The charger may start charging the battery of the electric vehicle according to the charging permission.

According to another embodiment of the present invention, there is provided a drive management method performed by an electric vehicle including a battery that stores power and a connection unit that is to be connected a charger that communicates with a management device capable of reading identification information specific to each electric vehicle from a security token brought into proximity or in contact, which includes the steps of prohibiting operation of a driving mechanism in a case predetermined processing relating to charging of the battery is started after the charger is connected to the connection unit, and permitting operation of the driving mechanism after the identification information of the electric vehicle is read from the security token by the management device.

According to another embodiment of the present invention, there is provided a drive management method which includes the steps of acquiring identification information specific to each electric vehicle by using a read apparatus that reads information from a security token brought into proximity or in contact, and notifying the electric vehicle corresponding to the identification information acquired in the step of acquiring identification information, among the electric vehicles having a function of prohibiting operation of a driving mechanism in a case predetermined processing relating to charging of a battery is started and operation of whose driving mechanisms has been prohibited by the function, of a driving permission for permitting operation of the driving mechanism.

According to another embodiment of the present invention, there is provided a program for causing a computer to realize a function of each structural element included in the electric vehicle. Also, according to another embodiment of the present invention, there is provided a program for causing a computer to realize a function of each structural element included in the management apparatus. Furthermore, according to another embodiment of the present invention, there is provided a recording medium in which the program is recorded, the recording medium being able to be read by a computer.

According to the embodiments of the present invention described above, a mechanism can be realized of encouraging a user of an electric vehicle to inevitably go to the installation location of a management device during charging, by using identification information specific to the electric vehicle stored in a security token.

BRIEF DESCRIPTION OF THE DRAWINGS

FIG. 3A is an explanatory diagram showing an example of a functional configuration of a charging apparatus according to the embodiment;

DETAILED DESCRIPTION OF THE EMBODIMENT

Figure 1:
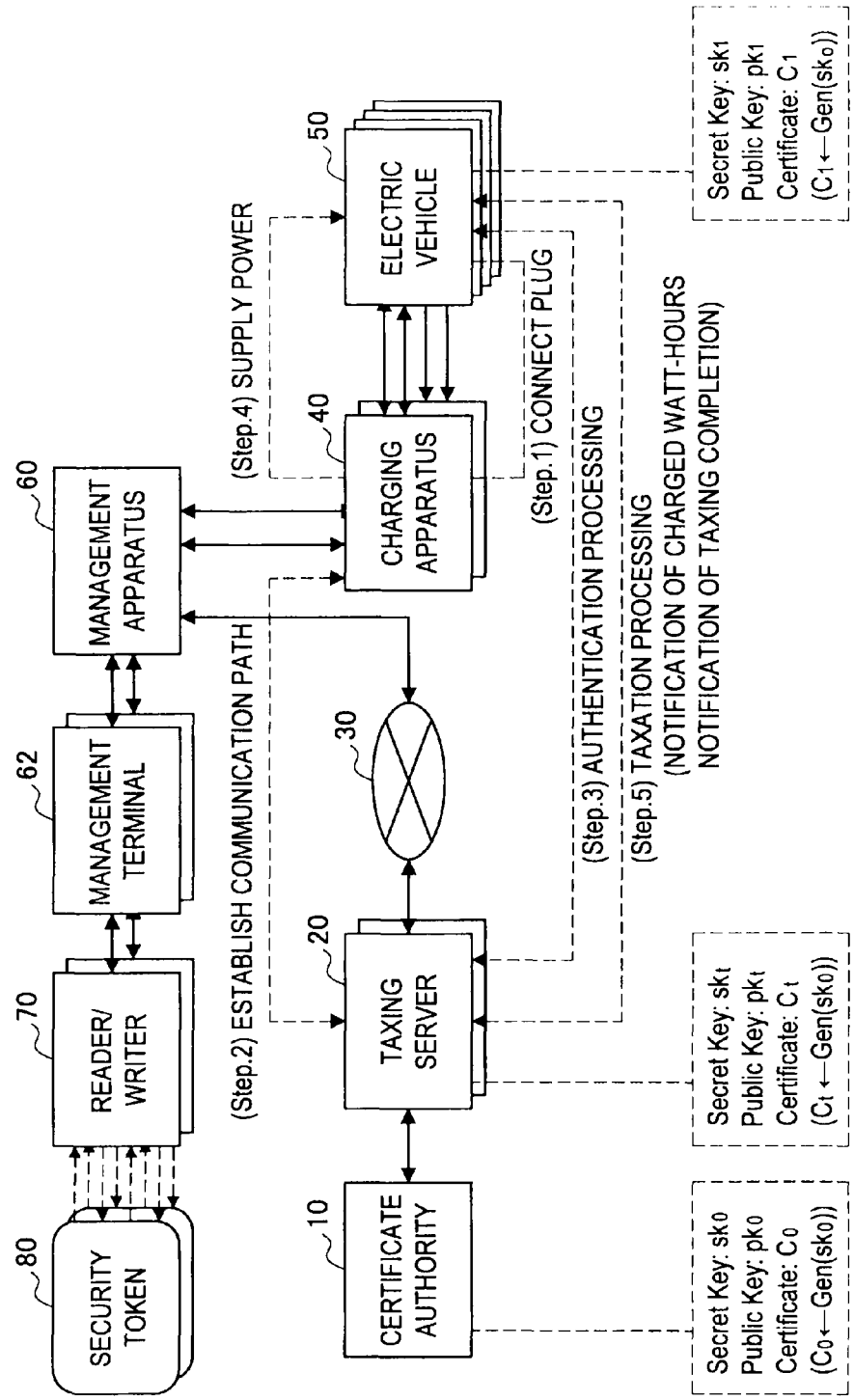
FIG. 1 is an explanatory diagram showing an example of a system configuration of a charging system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The flow of description of an embodiment of the present invention described below will briefly be mentioned. First, a system configuration of a charging system according to an embodiment of the present invention will be described with reference to FIG. 1. Next, a configuration of a public key certificate used by an electric vehicle 50 according to the embodiment for authentication processing will be described with reference to FIG. 2. Next, a functional configuration of a charging apparatus 40 according to the embodiment will be described with reference to FIG. 3. Next, a functional configuration of the electric vehicle 50 according to the embodiment will be described with reference to FIG. 4. Then, a functional configuration of a management apparatus 60 according to the embodiment will be described with reference to FIG. 5.

Figure 6:
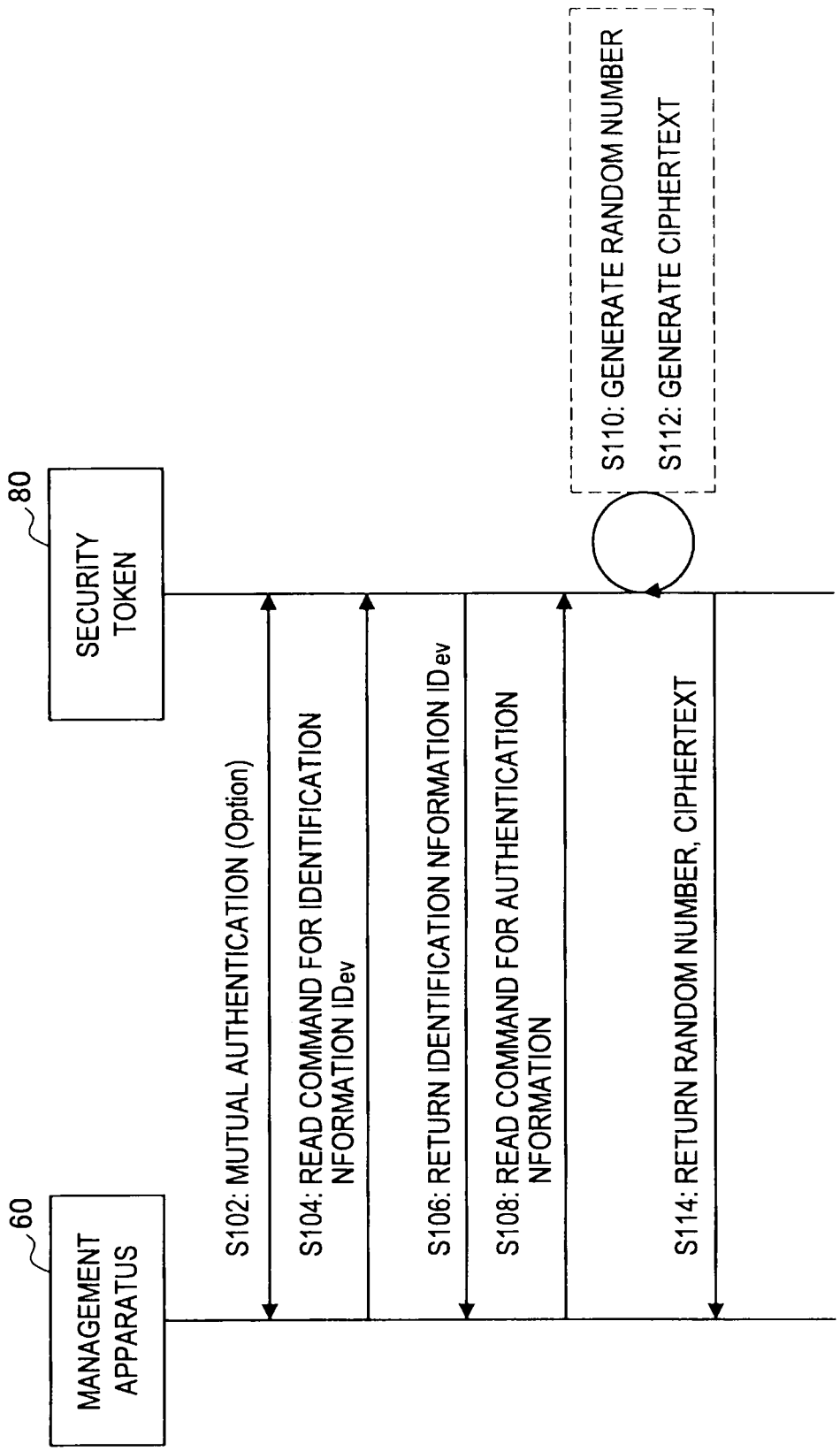
FIG. 6 is an explanatory diagram showing a flow of processing performed at the time of the management apparatus reading authentication information from a security token.

Next, reading processing of authentication information by the management apparatus 60 from a security token 80 according to the embodiment will be described with reference to FIG. 6. Next, a flow of authentication processing performed between the charging apparatus 40 and the electric vehicle 50 according to the embodiment will be described with reference to FIGS. 7 and 8. Then, a drive management method of the electric vehicle 50 and a method of managing charging of the electric vehicle 50 according to the embodiment will be described with reference to FIG. 9. Exchange of information used for taxation processing by a taxing server 20 will also be described in detail here.

Next, a system configuration of a charging system according to a modification of the embodiment will be described with reference to FIGS. 10 and 11. Then, a drive management method of the electric vehicle 50 and a method of managing charging of the electric vehicle 50 according to a modification of the embodiment will be described with reference to FIG. 12. Next, an example of a hardware configuration capable of realizing authentication processing and signature generation/signature verification processing according to the embodiment will be described with reference to FIG. 13. Lastly, technical ideas of the embodiment will be summarized and operational effects obtained from the technical ideas will briefly be described.

(Description Items)

1: Embodiment
    1-1: Introduction
    1-2: Overall Configuration of Charging System
    1-2-1: System configuration
    1-2-2: Flow of Taxation Processing, Drive Management
    1-3: Functional Configuration of Charging Apparatus 40
    1-4: Functional Configuration of Electric vehicle 50
    1-5: Functional Configuration of Management Apparatus 60
    1-6: Drive Management Method during Charging 2: Modification (Configuration Providing Authentication Function to Charging Facility)
    2-1: System Configuration
    2-2: Drive Management Method during Charging 3: Hardware Configuration Example 4: Summary <1: Embodiment>

In the following, an embodiment of the present invention will be described. The present embodiment relates to a mechanism of encouraging a user of an electric vehicle to inevitably go to the installation location of a management device during charging, by using identification information specific to the electric vehicle stored in a security token. Also, the present embodiment relates to a mechanism of securely and reliably collecting taxes imposed at the time of charging an electric vehicle.

<1-1: Introduction>

A charging system according to the present embodiment is designed taking taxation processing according to charged watt-hours into consideration. Accordingly, an issue relating to taxation on an electric vehicle (an electric car is taken as an example here) will be briefly described. To impose a tax on an electric car, information for identifying a device related to taxation on the electric car becomes necessary. Information that can be managed at the time of charging an electric car includes, for example, information about charging facilities, information about the electric car, and information about charged watt-hours. If such information is used, a mechanism that enables billing and settlement of electricity fees in accordance with charged watt-hours during charging can be realized, for example. However, realization of a mechanism capable of performing taxation processing of taxes imposed on the electric car in accordance with charged watt-hours during charging entails great difficulties.

A gasoline fee of a vehicle usually includes taxes such as a road tax and carbon tax. The road tax is a tax specific to the vehicle, imposed for the purpose of billing the driver of the vehicle for the burden of costs related to roads. The carbon tax, on the other hand, is a tax imposed on all people who use fossil fuel, for the purpose of using the tax for environment maintenance. If a tax corresponding to the road tax should be imposed on all electricity used in ordinary households, taxation processing will be simpler, but a new issue arises that a tax specific to the vehicle is imposed also on electricity fees used for other than charging of electric cars. If outlets dedicated to charging of electric cars are provided, it is possible to provide a mechanism to impose a tax only when the dedicated outlets are used, but a heavy burden of costs will be shouldered by parties involved because installation costs of the dedicated outlets and fee management for individual dedicated outlets will be necessary, resulting in the prevention of widespread use of electric cars.

Taxation on electric cars has such issue as described above. Therefore, to solve such issue, the present embodiment proposes a mechanism of utilizing a smart grid infrastructure and performing taxation processing directly between an electric car and a taxer. Also, to realize this mechanism, a mechanism of securely exchanging information between the electric car and the taxer is proposed. Furthermore, a mechanism of preventing tax evasion during charging is proposed. The above-described difficulty relating to the taxation processing on electric cars can be solved by combining these mechanisms. Additionally, it should be noted that, although explanation has been made here taking an electric car as an example, the issue relating to the taxation processing also applies to other electric vehicles.

In the following, first, a mechanism for realizing a sales promotion service utilizing a security token will be described while simply describing a mechanism relating to taxation processing. Then, a mechanism of securely and reliably collecting tax from an electric vehicle at the time of charging will be described in detail.

<1-2: Overall Configuration of Charging System>

First, an overall configuration of a charging system according to the present embodiment will be described with reference to FIG. 1. FIG. 1 is an explanatory diagram showing an example of a system configuration of a charging system according to the present embodiment and a flow (outline) of taxation processing performed in the charging system during charging. Additionally, the system configuration of the charging system shown in FIG. 1 is only an example, and the system configuration can arbitrarily be modified within a range in which the technical feature according to the present embodiment can be maintained.

The system configuration and the flow of taxation processing will be sequentially described below.

(1-2-1: System Configuration)

As shown in FIG. 1, the charging system is composed of a certificate authority 10, a taxing server 20, a charging apparatus 40, an electric vehicle 50, a management apparatus 60, and a reader/writer 70. The taxing server 20 is connected to the charging apparatus 40 via a network 30.

(Certificate Authority 10)

The certificate authority 10 is an organization that issues a public key certificate. The certificate authority 10 is controlled, for example, by a state. The certificate authority 10 holds a secret key $sk_O$ and a public key $pk_O$ paired with the secret key $sk_O$. Furthermore, the certificate authority 10 holds a public key certificate $C_O$ generated using the secret key $sk_O$. The public key certificate $C_O$ contains the public key $pk_O$.

(Taxing Server 20)

The taxing server 20 is means for performing taxation processing on the owner of the electric vehicle 50. The taxing server 20 is controlled, for example, by the National Tax Agency. The taxing server 20 holds a secret key $sk_t$ and a public key $pk_t$ paired with the secret key $sk_t$. Furthermore, the taxing server 20 holds a public key certificate $C_t$ generated by the certificate authority 10 using the secret key $sk_O$. The public key certificate $C_t$ contains the public key $pk_t$.

(Charging Apparatus 40)

The charging apparatus 40 is means for supplying power to the electric vehicle 50 connected to a plug. Also, the charging apparatus 40 can transmit information to the management apparatus 60 or receive information from the management apparatus 60. The charging apparatus 40 can also be connected to the network 30 via the management apparatus 60, and transmit information to the taxing server 20 or receive information from the taxing server 20 via the management apparatus 60. Furthermore, the charging apparatus 40 can transmit information to the electric vehicle 50 connected to the plug or receive information from the electric vehicle 50 connected to the plug.

(Electric Vehicle 50)

The electric vehicle 50 has batteries to store power mounted thereon. The electric vehicle 50 also includes a driving mechanism for driving by using power stored in batteries. Furthermore, the electric vehicle 50 can transmit or receive information to/from the taxing server 20 via the charging apparatus 40, the management apparatus 60 and the network 30. The electric vehicle 50 can also transmit or receive information to/from the management apparatus 60 via the charging apparatus 40.

Furthermore, the electric vehicle 50 holds a secret key $sk_1$ and a public key $pk_1$ paired with the secret key $sk_1$. Furthermore, the electric vehicle 50 holds a public key certificate $C_1$ generated by the certificate authority 10 using the secret key $sk_0$. The public key certificate $C_1$ contains the public key $pk_1$.

(Management Apparatus 60, Management Terminal 62, Reader/Writer 70)

The management apparatus 60 is means for carrying out charging management and drive management of the electric vehicle 50 connected to the charging apparatus 40. The management apparatus 60 may also be configured to carry out management of a parking fee of the electric vehicle, in addition to the drive management and the charging management. Furthermore, the management apparatus 60 is connected to a plurality of management terminals 62. Each management terminal 62 is connected to the reader/writer 70. The management terminal 62 is installed in a retail store or a parking lot, for example. The reader/writer 70 reads or writes information in a security token 80 brought into proximity or in contact. Additionally, information read from the security token 80 is input to the management apparatus 60 via the management terminal 62.

(Security Token 80)

The security token 80 securely holds identification information for identifying the electric vehicle 50. The security token 80 also securely holds key information for generating a ciphertext. Furthermore, the security token 80 includes a random number generator for generating a random number within the security token 80. The security token 80 also includes a cipher generator for generating a ciphertext by using the key information that is securely being held. A transponder key or a non-contact IC card can be used as the security token 80, for example.

(1-2-2: Flow of Taxation Processing, Drive Management)

First, the user of the electric vehicle 50 parks the electric vehicle 50 in a place where the charging apparatus 40 is installed. Then, the user of the electric vehicle 50 brings his/her security token 80 into proximity or in contact with the reader/writer 70 installed in the store, parking lot, or the like. At this time, the reader/writer 70 reads identification information from the security token 80. Then, the identification information read by the reader/writer 70 is input to the management apparatus 60 via the management terminal 62. Next, the management apparatus 60 inputs, to the charging apparatus 40, the identification information input from the reader/writer 70.

When the electric vehicle 50 and the charging apparatus 40 are connected by a plug (Step 1), the charging apparatus 40 detects the electric vehicle 50 by using the identification information input from the management apparatus 60. In a case a plurality of electric vehicles 50 are connected, the charging apparatus 40 detects the electric vehicle 50 which is the target of processing by using the identification information. When detection of the electric vehicle 50 succeeds, the charging apparatus 40 performs authentication processing as appropriate. The charging apparatus 40 that succeeded in the detection and the authentication processing establishes a communication path between the charging apparatus 40 and the electric vehicle 50 and a communication path between the charging apparatus 40 and the taxing server 20 via the management apparatus 60 (Step 2).

Additionally, in a case of performing mutual authentication between the charging apparatus 40 and the electric vehicle 50, the management apparatus 60 acquires the identification information of the electric vehicle 50, the random number and the ciphertext from the security token 80 by using the management terminal 62 and the reader/writer 70 and inputs the same to the charging apparatus 40. This random number is generated by the random number generator of the security token 80. Also, this ciphertext is the random number which has been encrypted by using the cipher generator based on the key information held by the security token 80. In this case, the charging apparatus 40 performs mutual authentication with the electric vehicle 50 by using the identification information, the random number and the ciphertext input from the management apparatus 60, and after succeeding in this mutual authentication, establishes the communication path to the taxing server 20.

When the communication path between the electric vehicle 50 and the taxing server 20 is established, authentication processing (for example, ISO9798-3) is performed between the electric vehicle 50 and the taxing server 20 (Step 3).

In Step 3, a random number $R_t$ is first generated by the taxing server 20 and transmitted to the electric vehicle 50. After receiving the random number $R_t$, the electric vehicle 50 generates a random number $R_1$ to generate a digital signature $S_1$ for a message containing the random numbers $R_1$ and $R_t$ (identification $ID_t$ of the taxing server 20 if necessary) using the secret key $sk_1$ of the electric vehicle 50. Then, the electric vehicle 50 transmits the public key certificate $C_1$, the random number $R_1$, and the digital signature $S_1$ to the taxing server 20.

After receiving the public key certificate $C_1$, the random number $R_1$, and the digital signature $S_1$, the taxing server 20 extracts the public key $pk_0$ from the public key certificate $C_0$ acquired from the certificate authority 10 in advance to verify the public key certificate $C_1$ using the extracted public key $pk_0$. After the verification is successful, the taxing server 20 extracts the public key $pk_1$ from the public key certificate $C_1$ to verify the digital signature $S_1$ using the extracted public key $pk_1$. If the verification is successful, the taxing server 20 authenticates the electric vehicle 50. Then, the taxing server 20 interchanges the order of the random number $R_t$ and the random number $R_1$ to generate a digital signature $S_t$ for a message containing the random numbers $R_1$ and $R_t$ (identification $ID_0$ of the electric vehicle 50 if necessary) using the secret key $sk_t$. Then, the taxing server 20 transmits the public key certificate $C_t$ thereof and the digital signature $S_t$ to the electric vehicle 50.

After receiving the public key certificate $C_t$ and the digital signature $S_t$, the electric vehicle 50 extracts the public key $pk_0$ from the public key certificate $C_0$ acquired from the certificate authority 10 in advance to verify the public key certificate $C_t$ using the extracted public key $pk_0$. After the verification is successful, the electric vehicle 50 extracts the public key $pk_t$ from the public key certificate $C_t$ to verify the digital signature $S_t$ using the extracted public key $pk_t$. If the verification is successful, the electric vehicle 50 authenticates the taxing server 20. If the authentication is successful in both the electric vehicle 50 and the taxing server 20, authentication processing in Step 3 is completed.

If complex authentication processing like the above one should not be performed, processing in Step 3 may be changed as described below.

In Step 3, the electric vehicle 50 first generates a digital signature $S_1'$ for a message containing the identification $ID_{EV}$ thereof using the secret key $sk_1$ thereof and transmits the public key certificate $C_1$ of the electric vehicle 50 and the digital signature $S_1'$ to the taxing server 20.

After receiving the public key certificate $C_1$ and the digital signature $S_1'$, the taxing server 20 extracts the public key $pk_0$ from the public key certificate $C_0$ acquired from the certificate authority 10 in advance to verify the public key certificate $C_1$ using the extracted public key $pk_0$. After the verification is successful, the taxing server 20 extracts the public key $pk_1$ from the public key certificate $C_1$ to verify the digital signature $S_1'$ using the extracted public key $pk_1$. If the verification is successful, the taxing server 20 authenticates the electric vehicle 50 and, with this processing, completes authentication processing in Step 3.

In this case, if a malicious third party intercepts the digital signature $S_1'$ exchanged in the past, the third party can pass authentication processing using this information, but whether abusive or not can be determined by following processing.

Processing in Step 3 can be further simplified by changing the processing as described below.

In Step 3, the public key certificate $C_t$ is first transmitted from the taxing server 20 to the electric vehicle 50. Next, the public key certificate $C_1$ is transmitted from the electric vehicle 50 to the taxing server 20. After receiving the public key certificate $C_t$ from the taxing server 20, the electric vehicle 50 extracts the public key $pk_0$ from the public key certificate $C_0$ acquired from the certificate authority 10 in advance to verify the public key certificate $C_t$ using the extracted public key $pk_0$.

On the other hand, after receiving the public key certificate $C_1$ from the electric vehicle 50, the taxing server 20 extracts the public key $pk_0$ from the public key certificate $C_0$ acquired from the certificate authority 10 in advance to verify the public key certificate $C_1$ using the extracted public key $pk_0$. Successful verification in both the electric vehicle 50 and the taxing server 20 completes authentication processing in Step 3.

Also in this case, a malicious third party can pass the authentication processing by acquiring the public key certificate $C_1$ of the electric vehicle 50 by some method but whether abusive or not can be determined by following processing.

If the authentication processing is successfully completed in Step 3, the charging apparatus 40 charges batteries of the electric vehicle 50 by supplying power to the electric vehicle 50 (Step 4). At this point, the electric vehicle 50 prohibits operation of the driving mechanism (for example, a motor). When charging of the batteries is completed, the electric vehicle 50 and the taxing server 20 start taxation processing (Step 5). Since authentication is successfully completed in Step 3, the taxing server 20 already correctly recognizes the owner (ID information (the above identification $ID_{EV}$) of the electric vehicle 50 contained in the public key certificate $C_1$) of the electric vehicle 50, and performs taxation processing with this owner as the taxable person.

In Step 5, the electric vehicle 50 first transmits information about charged watt-hours to the taxing server 20 (notification of charged watt-hours). After receiving information about charged watt-hours from the electric vehicle 50, the taxing server 20 performs taxation processing based on the charged watt-hours. For example, the taxing server 20 calculates a tax amount in accordance with the charged watt-hours and records the calculated tax amount in association with the owner of the electric vehicle 50. When such taxation processing is completed, the taxing server 20 transmits information indicating completion of taxation processing to the electric vehicle 50 (notification of taxing completion). The electric vehicle 50 receives information indicating completion of taxation processing from the taxing server 20, and maintains a state where the taxation processing is complete (hereinafter, taxing complete state).

When the user of the electric vehicle 50 again brings the security token 80 into proximity or in contact with the reader/writer 70, the management apparatus 60 acquires identification information from the security token 80 via the reader/writer 70. Next, the management apparatus 60 inputs the acquired identification information to the charging apparatus 40. When the identification information is input, the charging apparatus 40 detects the electric vehicle 50 corresponding to the identification information input from the management apparatus 60. Then, the charging apparatus 40 transmits to the electric vehicle 50 permission information indicating operation permission of the driving mechanism. In a case the electric vehicle 50 is in the taxing complete state, the electric vehicle 50 permits operation of the driving mechanism in accordance with the reception of the permission information. On the other hand, in a case the electric vehicle 50 is not in the taxing complete state, the electric vehicle 50 permits operation of the driving mechanism in accordance with the notification of taxing completion after the reception of the permission information.

In the foregoing, the system configuration and the flow of taxation processing have been briefly described. According to such mechanism, the electric vehicle 50 will not be moved until the security token 80 is brought into proximity or in contact with the reader/writer 70 installed in a store, parking lot, or the like, and thus the user will inevitably go to the installation location of the reader/writer 70. Furthermore, the electric vehicle 50 will not be moved until the taxation processing is complete, and thus the tax can be reliably collected. Also, although the identification information will be exported outside the electric vehicle 50, the security token 80 will be used and the identification information will be securely managed.

(Modification of Certificate Authority 10)

Figure 2:
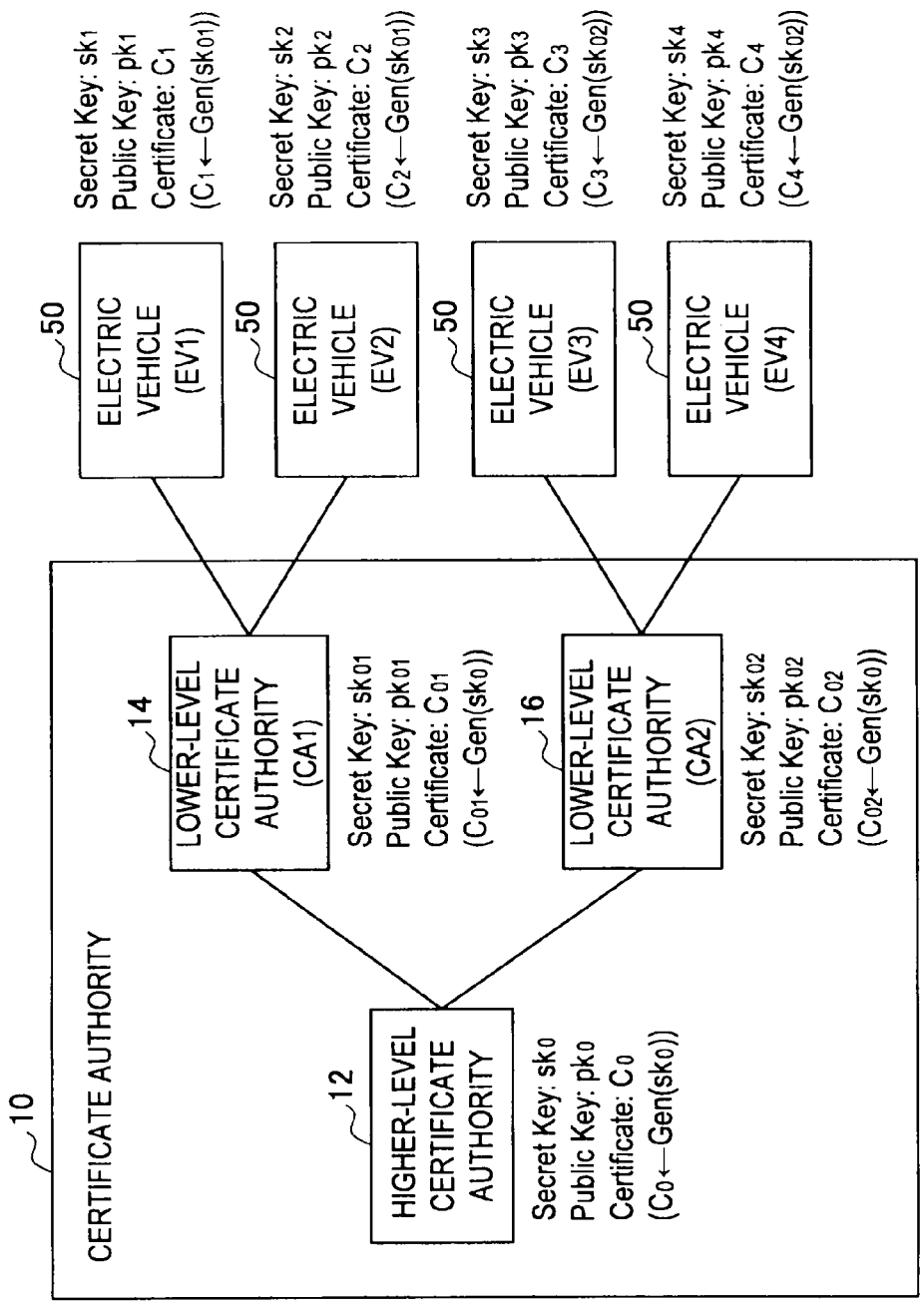
FIG. 2 is an explanatory diagram showing an example of a configuration of a public key certificate used for authentication processing by an electric vehicle according to the embodiment.

In the example of FIG. 1, the certificate authority 10 is controlled from one location. However, if the number of the electric vehicles 50 increases, the load on the certificate authority 10 also increases. Thus, as shown in FIG. 2, a modification may be made to hierarchically control the certificate authority 10. The modification will briefly be described below. As shown in FIG. 2, the certificate authority 10 has a hierarchical structure including a higher-level certificate authority 12 and lower-level certificate authorities 14 and 16.

The higher-level certificate authority 12 holds the secret key $sk_0$ and the public key $pk_0$ paired with the secret key $sk_0$. Furthermore, the higher-level certificate authority 12 holds the public key certificate $C_0$ generated using the secret key $sk_0$. The lower-level certificate authority 14 holds a secret key $sk_{01}$ and a public key $pk_{01}$ paired with the secret key $sk_{01}$. Furthermore, the lower-level certificate authority 14 holds a public key certificate $C_{0l}$ generated by the higher-level certificate authority 12 using the secret key $sk_0$.

The lower-level certificate authority 16 holds a secret key $sk_{02}$ and a public key $pk_{02}$ paired with the secret key $sk_{02}$. Furthermore, the lower-level certificate authority 16 holds a public key certificate $C_{02}$ generated by the higher-level certificate authority 12 using the secret key $sk_0$. The public key certificate $C_0$ contains the public key $pk_0$, the public key certificate $C_{01}$ contains the public key $pk_{01}$, and the public key certificate $C_{02}$ contains the public key $pk_{02}$.

The electric vehicle 50 (EV1) holds the secret key $sk_1$ and the public key $pk_1$ paired with the secret key $sk_1$. Furthermore, the electric vehicle 50 (EV1) holds the public key certificate $C_1$ generated by the lower-level certificate authority 14 using the secret key $sk_{01}$. Similarly, the electric vehicle 50 (EV2) holds a secret key $sk_2$ and a public key $pk_2$ paired with the secret key $sk_2$. Furthermore, the electric vehicle 50 (EV2) holds a public key certificate $C_2$ generated by the lower-level certificate authority 14 using the secret key $sk_{01}$.

The electric vehicle 50 (EV3) holds a secret key $sk_3$ and a public key $pk_3$ paired with the secret key $sk_3$. Furthermore, the electric vehicle 50 (EV3) holds a public key certificate $C_3$ generated by the lower-level certificate authority 16 using the secret key $sk_{02}$. Similarly, the electric vehicle 50 (EV4) holds a secret key $sk_4$ and a public key $pk_4$ paired with the secret key $sk_4$. Furthermore, the electric vehicle 50 (EV4) holds a public key certificate $C_4$ generated by the lower-level certificate authority 16 using the secret key $sk_{02}$.

Thus, if the configuration of the certificate authority 10 is modified to a hierarchical configuration, the authentication processing shown in Step 3 above (1-2-2: Flow of Taxation Processing, Drive Management) is modified as shown below. Here, the electric vehicle 50 (EV1) is taken as an example and only the exchange of the public key certificate to be modified will be described.

Public key certificates to be transmitted from the taxing server 20 to the electric vehicle 50 (EV1) in Step 3 include only the public key certificate $C_t$. Public key certificates to be transmitted from the electric vehicle 50 (EV1) to the taxing server 20 include, in addition to the public key certificate $C_1$, the public key certificate $C_{01}$ acquired in advance by the electric vehicle 50 (EV1) from the lower-level certificate authority 14. After receiving the public key certificate $C_t$ from the taxing server 20, the electric vehicle 50 (EV1) extracts the public key $pk_0$ from the public key certificate $C_0$ acquired in advance from the higher-level certificate authority 12 to verify the public key certificate $C_t$ using the extracted public key $pk_0$.

On the other hand, after receiving the public key certificate $C_{0t}$ from the electric vehicle 50 (EV1), the taxing server 20 extracts the public key $pk_0$ from the public key certificate $C_0$ acquired in advance from the higher-level certificate authority 12 to verify the public key certificate $C_{01}$ using the extracted public key $pk_0$. If the verification is successful, the taxing server 20 extracts the public key $pk_{01}$ from the public key certificate $C_{0t}$ to verify the public key certificate $C_1$ received from the electric vehicle 50 (EV1) using the extracted public key $pk_{01}$. The following processing is the same as described above and if authentication is successful in both the electric vehicle 50 (EV1) and the taxing server 20, the authentication in Step 3 is successful. Authentication processing can similarly be performed for the electric vehicle 50 (EV2), the electric vehicle 50 (EV3), and the electric vehicle 50 (EV4).

In the foregoing, a modification of the configuration of the certificate authority 10 has been described.

The charging system according to the present embodiment performs, as described above, taxation processing by directly exchanging information between the electric vehicle 50 and the taxing server 20. By adopting such a configuration, a mechanism capable of imposing taxes specific to the electric vehicle 50 on the owner of the electric vehicle 50 can be realized without providing a special outlet dedicated to charging the electric vehicle 50.

Furthermore, after charging is started, the electric vehicle 50 prohibits operation of the driving mechanism until the taxation processing is completed. By adopting such a configuration, the owner of the electric vehicle 50 can reliably be taxed. Furthermore, since the electric vehicle 50 will not be moved until the security token 80 is brought into proximity or in contact with the reader/writer 70 at the time of start of charging or at the time of leaving, the user will inevitably go to the installation location of the reader/writer 70. As a result, by elaborating on the installation method of the reader/writer 70 or the timing of use of the reader/writer 70, it becomes possible to encourage the user to use other services during charging.

While the overall system configuration of the charging system according to the present embodiment has been described heretofore, the functional configurations of the charging apparatus 40, the electric vehicle 50, and the management apparatus 60 constituting the charging system will be described in more detail below.

<1-3: Functional Configuration of Charging Apparatus 40>

First, a functional configuration of the charging apparatus 40 will be described with reference to FIG. 3A. FIG. 3A is an explanatory diagram showing an example of a functional configuration of the charging apparatus 40.

As shown in FIG. 3A, the charging apparatus 40 mainly includes a communication unit 402, a control unit 404, an input/output unit 406, and a power supply unit 408.

(Description of Function)

The communication unit 402 is means for communicating with the management apparatus 60. The communication unit 402 can also connect to the network 30 via the management apparatus 60, and communicate with the taxing server 20. The control unit 404 is means for controlling operations of the communication unit 402, the input/output unit 406, and the power supply unit 408. The input/output unit 406 is means for supplying power to the electric vehicle 50 connected via a plug. The input/output unit 406 also transmits information to the electric vehicle 50 connected via the plug or receives information from the electric vehicle 50 connected via the plug. The power supply unit 408 is a power source (power generation means or batteries) to supply power to the electric vehicle 50 connected via the plug via the input/output unit 406. Also, the communication means 402 is means for communicating with the taxing server 20 via the network 30, and for exchanging information with the management apparatus 60.

(Description of Operation)

When the electric vehicle 50 is connected to a plug, the input/output unit 406 detects that the electric vehicle 50 has been connected to the plug. Then, the input/output unit 406 notifies the control unit 404 of the connection of the electric vehicle 50. After being notified of the connection of the electric vehicle 50 from the input/output unit 406, the control unit 404 controls the communication unit 402 to establish a communication path, through the management apparatus 60, to the taxing server 20.

Furthermore, when a random number, a ciphertext, and identification information are input from the management apparatus 60 via the communication unit 402, the control unit 404 performs mutual authentication with the electric vehicle 50 by using the random number, the ciphertext, and the identification information. In a case the mutual authentication is successful, the control unit 404 establishes a communication path to the electric vehicle 50 via the input/output unit 406. Also, the control unit 404 receives, from the management apparatus 60 via the communication unit 402, a charging permission command indicating permission to charge. The control unit 404 that received this charging permission command will be in a state where power supply to the electric vehicle 50 is enabled.

When the communication path to the electric vehicle 50 is established, the input/output unit 406 receives a public key certificate (hereinafter, a vehicle certificate) transmitted by the electric vehicle 50 and used for authentication processing. Then, the input/output unit 406 inputs the vehicle certificate received from the electric vehicle 50 to the control unit 404. The control unit 404 transmits the vehicle certificate input by the input/output unit 406 to the taxing server 20 via the communication unit 402.

The communication unit 402 also receives a public key certificate (hereinafter, a server certificate) transmitted by the taxing server 20 and used for authentication. Then, the communication unit 402 inputs the server certificate received from the taxing server 20 to the control unit 404. The control unit 404 transmits the server certificate input by the communication unit 402 to the electric vehicle 50 via the input/output unit 406. If verification of the vehicle certificate by the taxing server 20 is successful and verification of the server certificate by the electric vehicle 50 is successful, the control unit 404 supplies power input from the power supply unit 408 to the electric vehicle 50 via the input/output unit 406.

When charging of the electric vehicle 50 is completed, the control unit 404 causes the power supply to the electric vehicle 50 to stop. On the other hand, the input/output unit 406 receives information about charged watt-hours transmitted by the electric vehicle 50. Then, the input/output unit 406 inputs the information about charged watt-hours received from the electric vehicle 50 to the control unit 404. The control unit 404 transmits the information about charged watt-hours input by the input/output unit 406 to the taxing server 20 via the communication unit 402.

When taxation processing by the taxing server 20 is completed, the communication unit 402 receives information indicating completion of taxation processing transmitted by the taxing server 20. Then, the communication unit 402 inputs the information indicating completion of taxation processing received from the taxing server 20 to the control unit 404. The control unit 404 transmits the information indicating completion of taxation processing input by the communication unit 402 to the electric vehicle 50 via the input/output unit 406.

Furthermore, when a driving permission of the electric vehicle 50 and the identification information are input from the management apparatus 60 via the communication unit 402, the control unit 404 detects the electric vehicle 50 corresponding to the input identification information, and transmits the permission information to the electric vehicle 50. Then, when the electric vehicle 50 is removed from the plug, the input/output unit 406 detects that the electric vehicle 50 has been removed from the plug. Then, the input/output unit 406 notifies the control unit 404 of removal of the electric vehicle 50.

In the foregoing, the function and operation of the charging apparatus 40 have been described. Charged watt-hours are managed by the electric vehicle 50 in the above description, but the control unit 404 of the charging apparatus 40 may be configured to manage the charged watt-hours. For example, the control unit 404 may be configured such that information about charged watt-hours is recorded and the taxing server 20 is notified, after charging is completed, of the recorded information about charged watt-hours. If such a configuration is adopted, the operation will be simplified because exchange of information about charged watt-hours between the electric vehicle 50 and the charging apparatus 40 will be unnecessary.

MODIFIED EXAMPLE

Modification Regarding Connection Method to Network

Figure 3B:
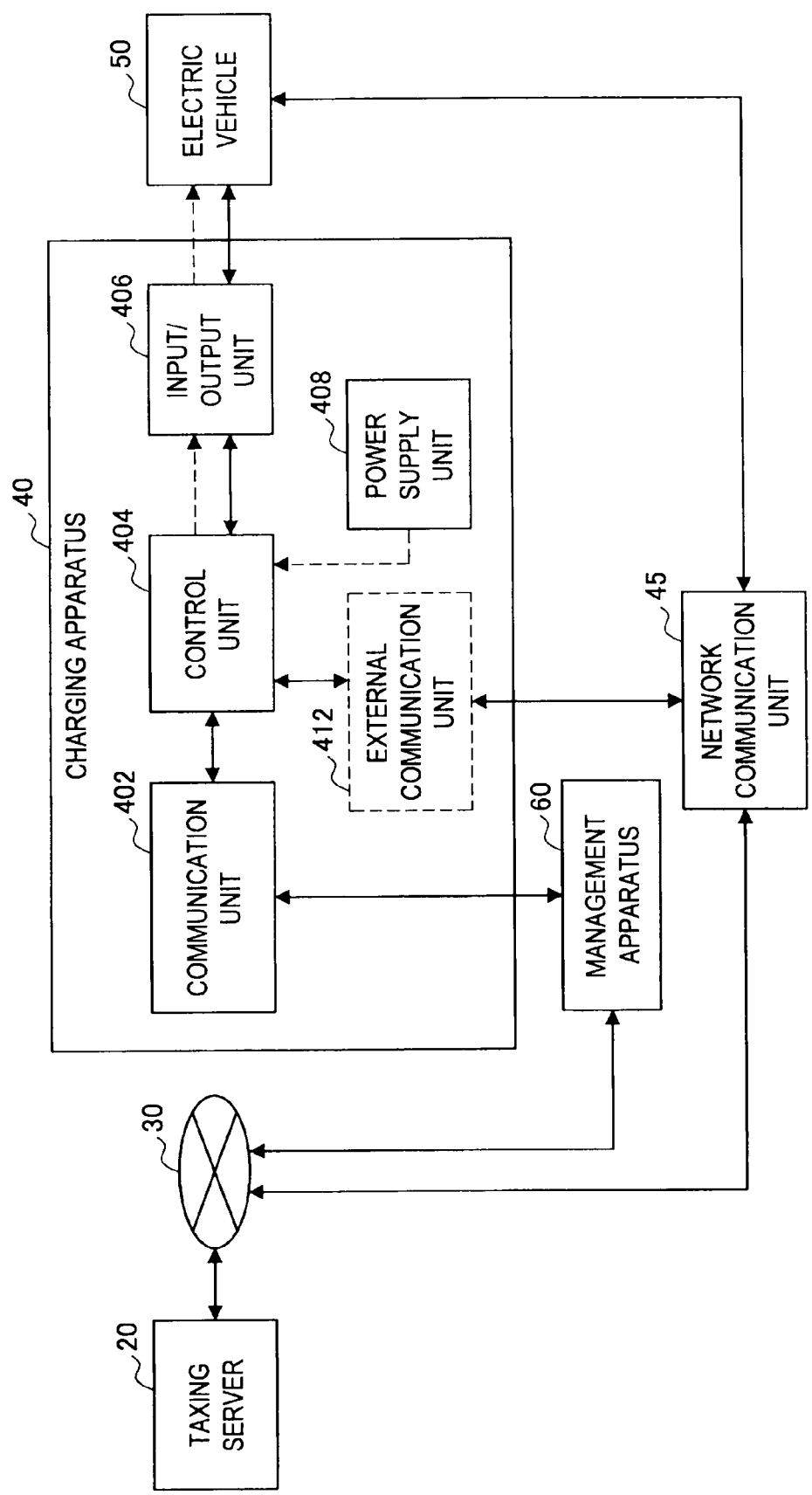
FIG. 3B is an explanatory diagram showing an example of a functional configuration of the charging apparatus according to the embodiment.

The charging apparatus 40 shown in FIG. 3A has the communication unit 402 to connect to the network 30 via the management apparatus 60. However, it is not absolutely necessary for the charging apparatus 40 to be able to connect to the network 30 via the management apparatus 60 to realize the function of the charging system according to the present embodiment. For example, as shown in FIG. 3B, the network 30 may be made connectible by using a network communication unit 45 outside the charging apparatus 40.

As a method of using the network communication unit 45, for example, a method of providing in the charging apparatus 40 an external communication unit 412 for connecting to the network communication unit 45 is available, as shown in FIG. 3B. If such a configuration is adopted, a connection function to connect to the network 30 can be realized by using the external network communication unit 45 even if an environment in which connection to the network 30 via the management apparatus 60 is enabled is not provided or connection to the network 30 via the management apparatus 60 is interrupted by some kind of trouble.

Instead of providing the external communication unit 412 in the charging apparatus 40, a method of realizing connection to the network 30 by the electric vehicle 50 directly using the network communication unit 45 is also available. In this case, information transmitted, by being addressed to the charging apparatus 40, through the network 30 is input into the charging apparatus 40 via the network communication unit 45, the electric vehicle 50, and the input/output unit 406. If there is information to be transmitted from the charging apparatus 40 through the network 30, the information is transmitted via the input/output unit 406, the electric vehicle 50, and the network communication unit 45.

The network communication unit 45 may be any communication means as long as the communication means is outside the charging apparatus 40. As the network communication unit 45, for example, any mobile communication apparatus such as a mobile phone, a mobile information terminal, and a notebook computer can be used. By using such a mobile communication apparatus as the communication means, the charging apparatus 40 may be spared the communication function to the network 30.

It is also possible to combine the configuration of the charging apparatus 40 shown in FIG. 3B and that of the charging apparatus 40 shown in FIG. 3A. In this case, the communication function using the network communication unit 45 can be used as backup means for when the communication function by the communication unit 402 does not function well (does not connect to the network 30). In this manner, the communication means of the charging apparatus 40 can be modified in various ways. Moreover, by combining these various communication means in accordance with the setup environment or utilization form of the charging apparatus 40, a charging system that is more secure and convenient can be realized.

<1-4: Functional Configuration of Electric Vehicle 50>

Figure 4:
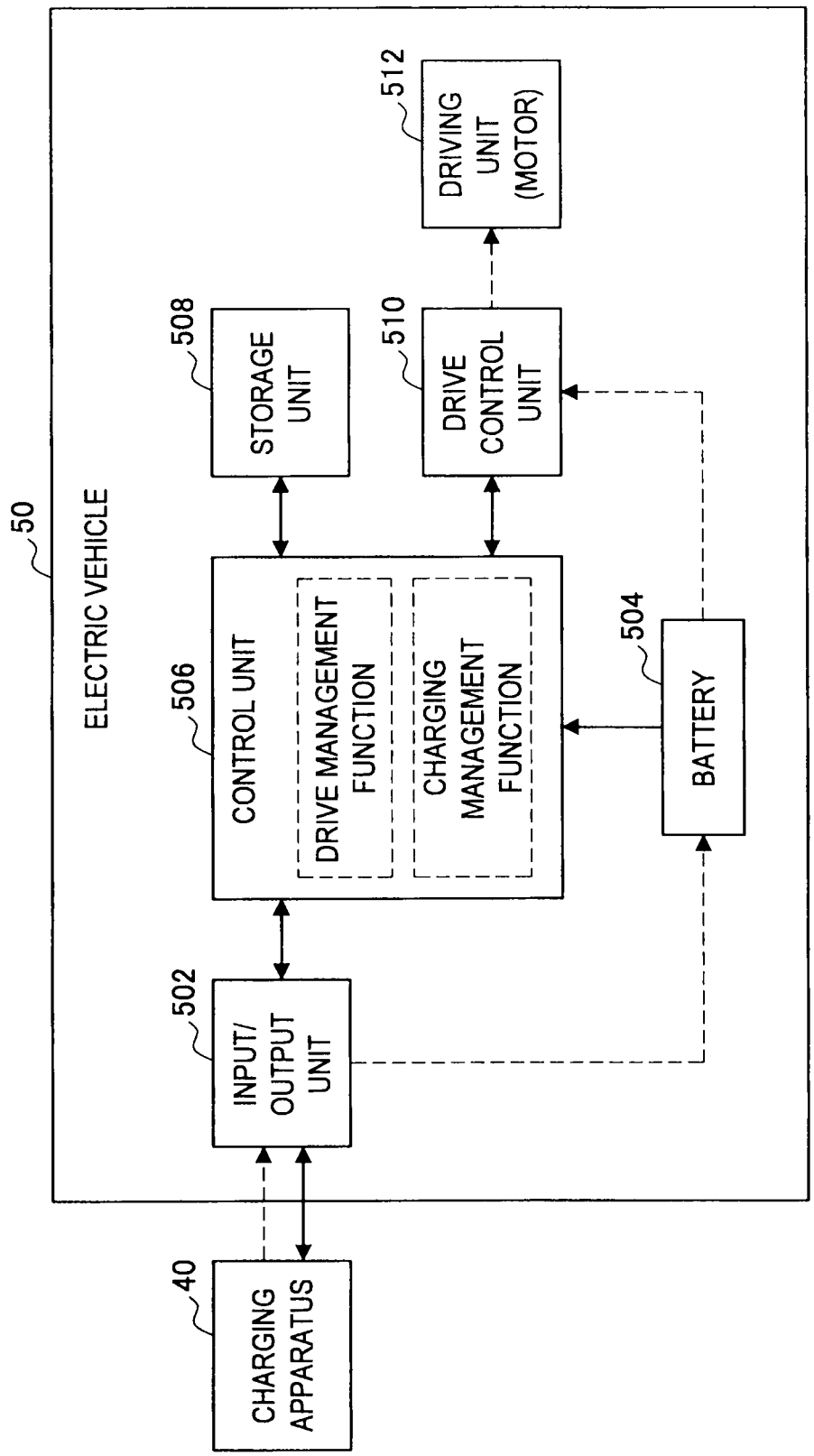
FIG. 4 is an explanatory diagram showing an example of a functional configuration of the electric vehicle according to the embodiment.

Next, a functional configuration of the electric vehicle 50 will be described with reference to FIG. 4. FIG. 4 is an explanatory diagram showing an example of a functional configuration of the electric vehicle 50.

As shown in FIG. 4, the electric vehicle 50 mainly includes an input/output unit 502, a battery 504, a control unit 506, a storage unit 508, a drive control unit 510, and a driving unit 512.

(Description of Function)

The input/output unit 502 is means for receiving the supply of power from the charging apparatus 40 while being connected to a plug. The input/output unit 502 transmits information to the charging apparatus 40 or receives information from the charging apparatus 40 while being connected to the plug. The battery 504 is means for storing power supplied from the charging apparatus 40 via the input/output unit 502.

The control unit 506 is means for controlling operations of the input/output unit 502, the battery 504, the storage unit 508, and the drive control unit 510. The control unit 506 has a drive management function regarding prohibition and permission of operation of the driving unit 512 and a charging management function regarding permission to charge the battery 504. The storage unit 508 is means for holding information such as secret keys, public keys, and public key certificates. The drive control unit 510 is means for controlling the operation of the driving unit 512. The driving unit 512 is a driving mechanism, including a motor, of the electric vehicle 50.

(Description of Operation)

When the electric vehicle 50 is connected to a plug, the input/output unit 502 detects completion of connection of the electric vehicle 50 to the plug. Then, the input/output unit 502 notifies the control unit 506 of the connection completion of the electric vehicle 50. After being notified of the connection completion of the electric vehicle 50 by the input/output unit 502, the control unit 506 performs mutual authentication with the charging apparatus 40. If the mutual authentication is successful and a communication path to the charging apparatus 40 is established, the control unit 506 reads from the storage unit 508 a public key certificate (vehicle certificate) used for authentication processing. Then, the control unit 506 transmits the vehicle certificate read from the storage unit 508 to the charging apparatus 40 via the input/output unit 502 while addressing the same to the taxing server 20.

The input/output unit 502 receives a public key certificate (server certificate) transmitted from the taxing server 20 and used for authentication processing via the charging apparatus 40. Then, the input/output unit 502 inputs the server certificate received via the charging apparatus 40 to the control unit 506. The control unit 506 verifies the server certificate input by the input/output unit 502. If verification of the server certificate is successful and verification of the vehicle certificate by the taxing server 20 is also successful, the control unit 506 requests via the input/output unit 502 the supply of power to the charging apparatus 40.

The control unit 506 also prohibits operation of the driving unit 512 by controlling the drive control unit 510. Furthermore, the control unit 506 allows the input/output unit 502 to charge the battery 504. When power is supplied from the charging apparatus 40, the input/output unit 502 supplies the power supplied from the charging apparatus 40 to the battery 504. The control unit 506 monitors the amount of stored charges of the battery 504 and, if the amount of stored charges of the battery 504 reaches a predetermined amount, controls the input/output unit 502 to stop charging of the battery 504. The control unit 506 also transmits, via the input/output unit 502, information about charged watt-hours to the charging apparatus 40 while addressing the same to the taxing server 20.

After taxation processing by the taxing server 20 is completed, the input/output unit 502 receives information indicating completion of taxation processing transmitted by the taxing server 20 via the charging apparatus 40. Then, the input/output unit 502 inputs the information indicating completion of taxation processing received from the taxing server 20 via the charging apparatus 40 to the control unit 506. Furthermore, the input/output unit 502 receives via the charging apparatus 40 a driving permission transmitted from the management apparatus 60, and inputs the same to the control unit 506. After the information indicating completion of taxation processing and the driving permission are input by the input/output unit 502, the control unit 506 controls the drive control unit 510 to permit operation of the driving unit 512. Then, the electric vehicle 50 is removed from the plug to become actually drivable.

In the foregoing, the function and operation of the electric vehicle 50 have been described. Charged watt-hours are managed by the control unit 506 in the above description, but the charging apparatus 40 may be configured to manage the charged watt-hours. If such a configuration is adopted, the operation will be simplified because exchange of information about charged watt-hours between the electric vehicle 50 and the charging apparatus 40 will be unnecessary.

<1-5: Functional Configuration of Management Apparatus 60>

Figure 5:
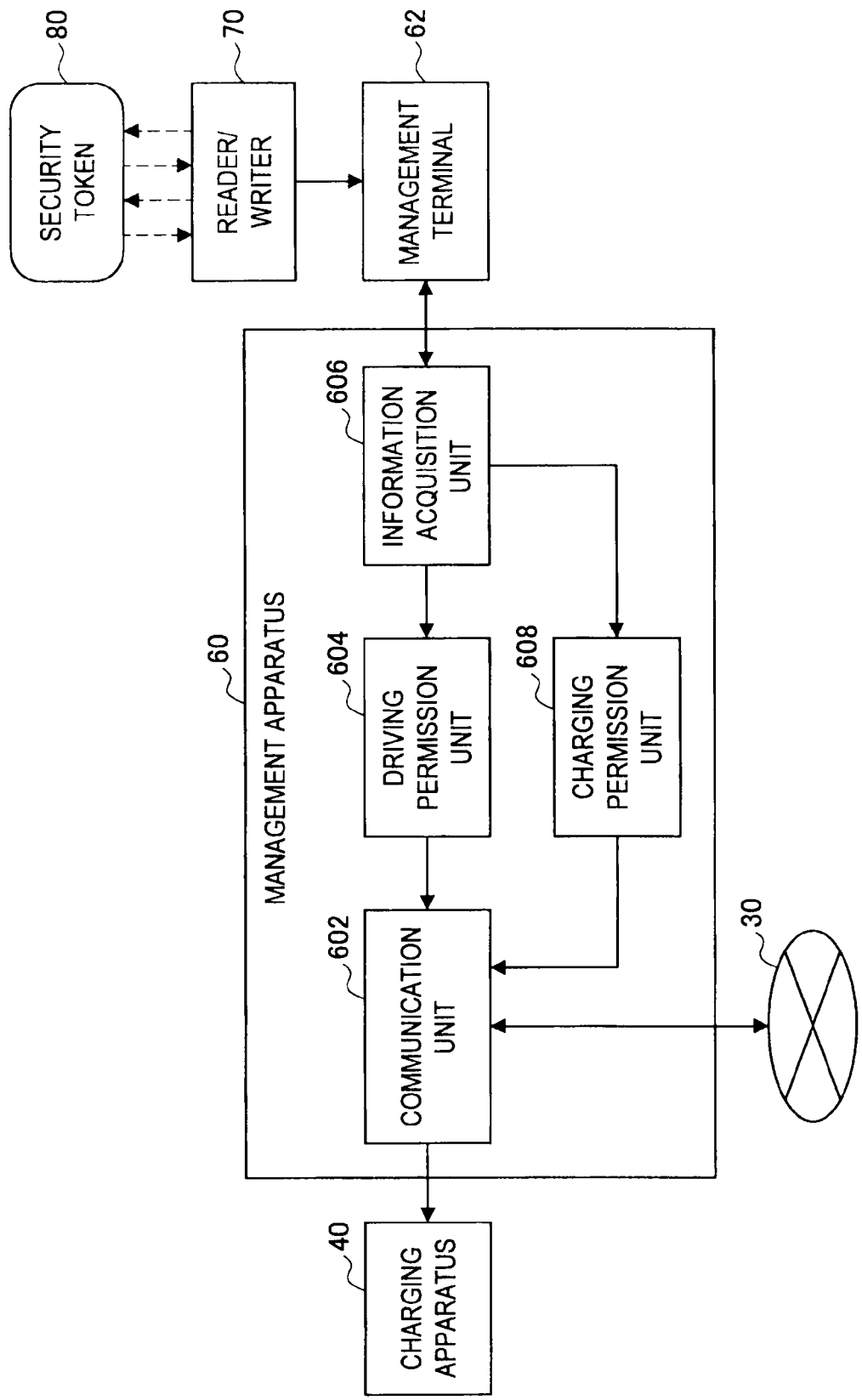
FIG. 5 is an explanatory diagram showing an example of a functional configuration of a management apparatus according to the embodiment.

Next, a functional configuration of the management apparatus 60 will be described with reference to FIG. 5. FIG. 5 is an explanatory diagram showing an example of a functional configuration of the management apparatus 60.

(Description of Function)

As shown in FIG. 5, the management apparatus 60 mainly includes a communication unit 602, a driving permission unit 604, an information acquisition unit 606, and a charging permission unit 608. Additionally, a part of the function of the management apparatus 60 may be allotted to the management terminal 62.

The communication unit 602 is means for transmitting/receiving information via the network 30. Furthermore, the communication unit 602 is also communication means for transmitting information to the charging apparatus 40 or receiving information from the charging apparatus 40. The driving permission unit 604 is means for issuing, to the electric vehicle 50 connected to the charging apparatus 40, a driving permission command for permitting driving. The information acquisition unit 606 is means for controlling the reader/writer 70 via the management terminal 62, and for acquiring information from the security token 80 using the reader/writer 70. For example, the information acquisition unit 606 acquires identification information of the electric vehicle 50, a random number, a ciphertext, and the like stored in the security token 80. The charging permission unit 608 is means for issuing a charging permission command for permitting charging of the electric vehicle 50 connected to the charging apparatus 40.

(Description of Operation)

When the security token 80 is brought into proximity or in contact with the reader/writer 70, the information acquisition unit 606 acquires, via the reader/writer 70, identification information of the electric vehicle 50 stored in the security token 80. Furthermore, the information acquisition unit 606 acquires a random number generated by the security token 80 and a ciphertext obtained by encrypting the random number based on key information stored in the security token 80. When these identification information, random number and ciphertext are acquired, the information acquisition unit 606 inputs the acquired identification information, random number and ciphertext to the charging permission unit 608.

The charging permission unit 608 issues, based on the identification information input by the information acquisition unit 606, a charging permission command for the electric vehicle 50 corresponding to the identification information. Then, the charging permission unit 608 transmits the issued charging permission command, the identification information, the random number, and the ciphertext to the charging apparatus 40 via the communication unit 602. As has been described, the charging apparatus 40 identifies the electric vehicle 50 to be charged by using the identification information, and performs mutual authentication with the identified electric vehicle 50 by using the random number and ciphertext. If the mutual authentication is successful, the charging apparatus 40 starts supplying power to the electric vehicle 50 in accordance with the charging permission command.

For example, the user of the electric vehicle 50 finishes shopping in the store or the like while charging. Then, the user brings the security token 80 into proximity or in contact with the reader/writer 70 before leaving. In a case the reader/writer 70 is installed at a cash desk of the store or the like, the user brings the security token 80 into proximity or in contact with the reader/writer 70 while making payment at the store or the like.

Additionally, in a case payment of the charging fee or a tax while making payment is enabled, the driving permission unit 604 acquires the information about watt-hours from the electric vehicle 50 or the charging apparatus 40 via the communication unit 602. Settlement means (not shown; display means of a charging fee and a tax amount and checking means for checking payment completion of the charging fee and tax amount are included, for example) provided in the management apparatus 60 requests the user for payment of the charging fee and tax amount. For example, the management apparatus 60 displays the charging fee on display means. Also, the management apparatus 60 checks by the checking means that the payment is completed. When the payment is confirmed by the settlement means, a payment completion notification indicating completion of payment is input to the driving permission unit 604.

When the payment completion notification is input from the settlement means and the identification information of the electric vehicle 50 read from the security token 80 by the information acquisition unit 606 is input, the driving permission unit 604 issues a driving permission addressed to the electric vehicle 50 indicated by the identification information. The driving permission issued by the driving permission unit 604 is transmitted, together with the identification information, to the charging apparatus 40 via the communication unit 602. When the identification information and the driving permission are received, the charging apparatus 40 detects the electric vehicle 50 corresponding to the received identification information, and transmits the driving permission to the electric vehicle 50. When the completion notification of taxation processing and driving permission are received, the electric vehicle 50 permits operation of the driving mechanism.

In the foregoing, the function and operation of the management apparatus 60 have been described. As described above, the management apparatus 60 acquires information from the security token 80 that is brought into proximity or in contact with the reader/writer 70, and carries out charging management and drive management of the electric vehicle 50 in accordance with the acquisition timing or the type of information acquired. If such a configuration is adopted, it becomes possible to make the user of the electric vehicle 50 inevitably go to the installation location of the reader/writer 70.

Additionally, the operation of the charging permission unit 608 (and the charging apparatus 40) described above can be modified as follows. First, the charging permission unit 608 transmits identification information input by the information acquisition unit 606 to the charging apparatus 40. Then, the charging apparatus 40 detects the electric vehicle 50 corresponding to the received identification information, and transmits the detection result (information about the detected electric vehicle 50) to the management apparatus 60. The detection result transmitted to the management apparatus 60 is input to the charging permission unit 608. Then, the charging permission unit 608 transmits, to the electric vehicle 50 indicated by the detection result, the charging permission command, random number, and ciphertext.

In this manner, by detecting the electric vehicle 50 to be given the charging permission and then providing information necessary for authentication processing to the charging apparatus 40 connected to the electric vehicle 50, it becomes unnecessary to transmit unneeded information to other charging apparatuses 40 not connected to the electric vehicle 50 charging of which is permitted.

<1-6: Drive Management Method During Charging>

In the following, explanation will be sequentially given on, of the drive management method according to the present embodiment, a flow of processing relating to drive management using the security token 80, and a flow of taxation processing.

(Details of Drive Management)

Figure 7:
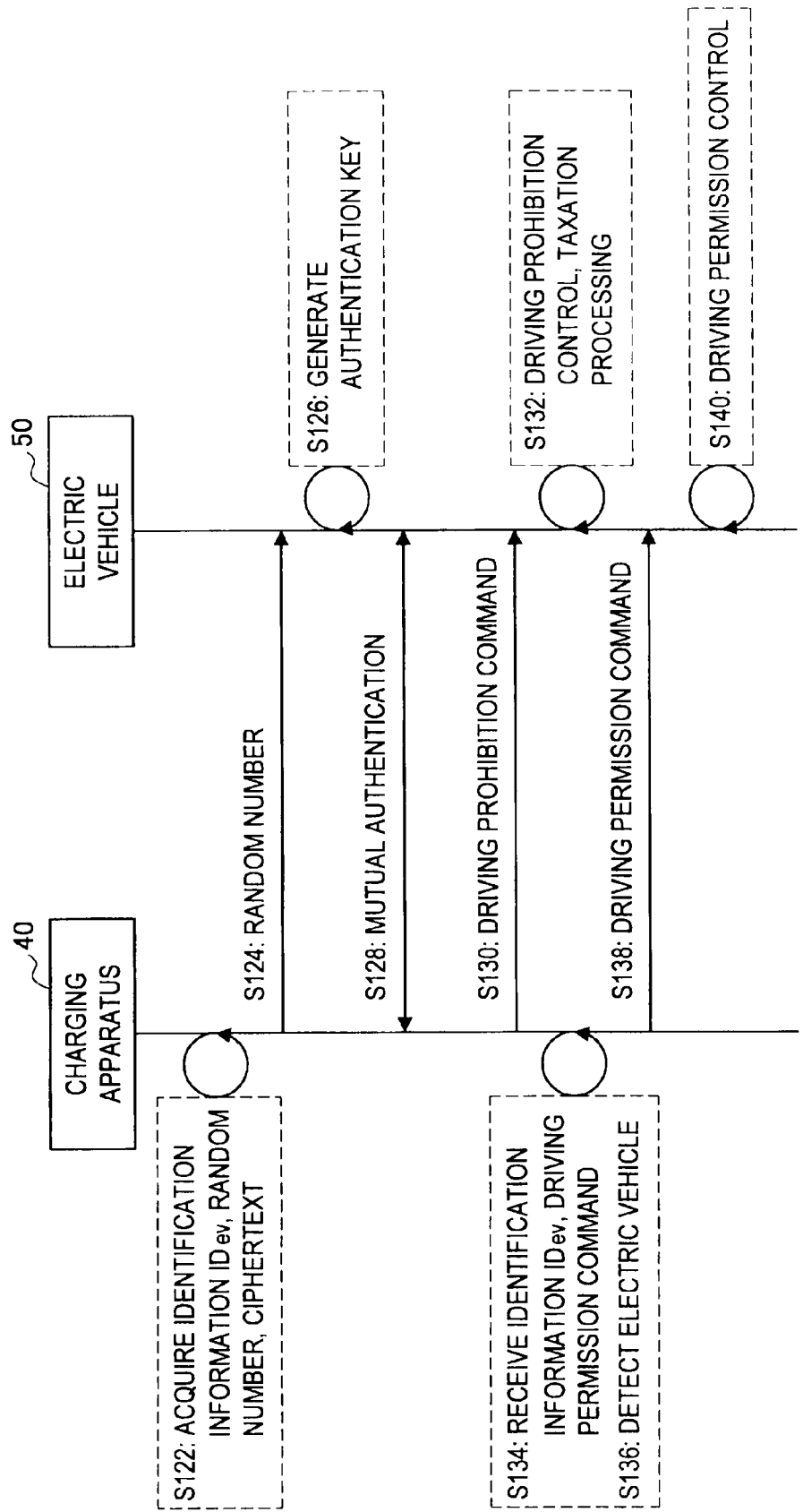
FIG. 7 is an explanatory diagram showing a flow of authentication processing performed between the charging apparatus and the electric vehicle according to the embodiment.
Figure 8:
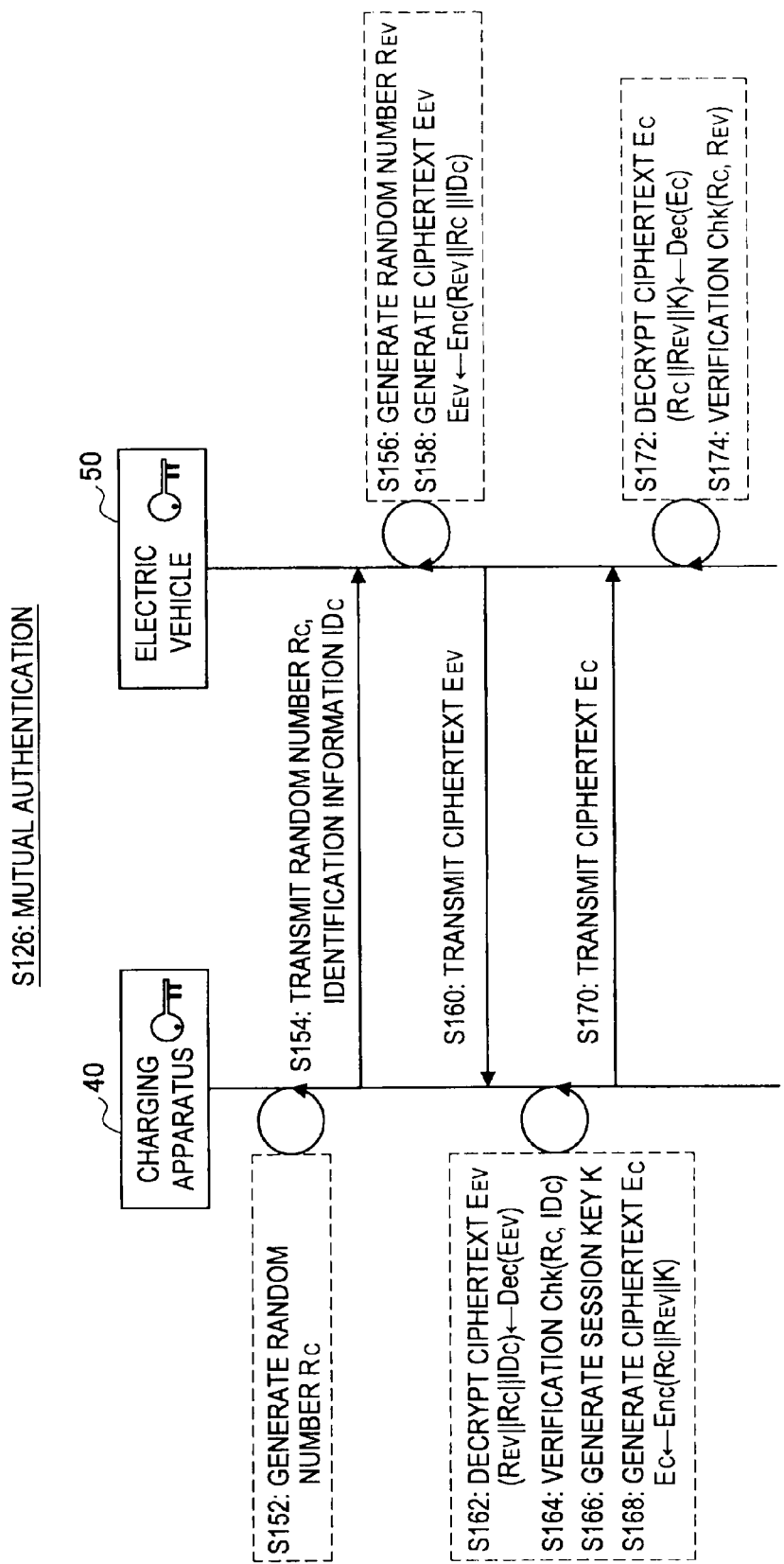
FIG. 8 is an explanatory diagram showing a detailed flow of mutual authentication processing performed between the charging apparatus and the electric vehicle according to the embodiment.

First, the drive management method according to the present embodiment will be described with reference to FIGS. 6 to 8. FIG. 6 is a sequence diagram showing exchange of information between the management apparatus 60 and the security token 80. FIG. 7 is a sequence diagram showing exchange of information between the charging apparatus 40 and the electric vehicle 50. FIG. 8 is an explanatory diagram showing a processing sequence of mutual authentication performed between the charging apparatus 40 and the electric vehicle 50.

First, reference will be made to FIG. 6. When the security token 80 is brought into proximity or in contact with the reader/writer 70, the management apparatus 60 performs mutual authentication with the security token 80 (S102). Here, this mutual authentication can be replaced by other authentication methods. The replacement of the authentication method in step S102 is preferably determined taking into consideration usage of the security token 80 to be used or its convenience. Here, it is assumed that mutual authentication is performed in step S102.

If the mutual authentication performed in step S102 is successful, a communication path is established between the management apparatus 60 and the security token 80. Then, the management apparatus 60 issues a read command for reading identification information $ID_{ev}$ from the security token 80, and transmits the read command to the security token 80 (S104). Next, when the read command is received, the security token 80 transmits the identification information $ID_{ev}$ to the management apparatus 60 (S106).

Next, when the identification information $ID_{ev}$ is received from the security token 80, the management apparatus 60 issues a read command for reading authentication information used for mutual authentication between the charging apparatus 40 and the electric vehicle 50, and transmits the read command to the security token 80 (S108). Next, when the read command is received, the security token 80 generates a random number (S110). Then, the security token 80 encrypts the generated random number by using key information that is securely held, and generates a ciphertext (S112). Next, the security token 80 transmits authentication information including the ciphertext and the random number to the management apparatus 60 (S114).

Then, the management apparatus 60 transmits the identification information $ID_{ev}$ and the authentication information read from the security token 80 to the charging apparatus 40.

Next, reference will be made to FIG. 7. The charging apparatus 40 receives the identification information $ID_{ev}$ and the authentication information transmitted from the management apparatus 60 (S122). As described above, the authentication information includes the random number and the ciphertext. Thus, the charging apparatus 40 uses the ciphertext included in the authentication information as an authentication key. Then, the charging apparatus 40 transmits the random number to the electric vehicle 50 (S124). Next, when the random number is received from the charging apparatus 40, the electric vehicle 50 generates an authentication key by using the received random number (S126). Then, mutual authentication (see FIG. 8) is performed between the charging apparatus 40 and the electric vehicle 50.

If the mutual authentication is successful, the charging apparatus 40 issues, for the electric vehicle 50, a driving prohibition command for prohibiting the operation of the driving mechanism, and transmits the same to the electric vehicle 50 (S130). Then, the electric vehicle 50 performs taxation processing (see FIG. 9) via the charging apparatus 40 (S132). Additionally, charging processing is performed in the taxation processing. Meanwhile, the user of the electric vehicle 50 who has finished shopping at the store, or the like, brings again the security token 80 into proximity or in contact with the reader/writer 70 installed at the cash desk of the store while performing payment processing or the like. As has been described, the identification information $ID_{ev}$ and the authentication information are read at this point.

The management terminal 62 that received the identification information $ID_{ev}$ and the authentication information from the reader/writer 70 transmits these pieces of information to the management apparatus 60. The management apparatus 60 that received these makes the charging apparatus 40 detect the electric vehicle 50 having the identification information $ID_{ev}$, and transmits a driving permission command to the charging apparatus 40 which has detected the electric vehicle 50.

Additionally, the management apparatus 60 may have combinations of the charging apparatuses 40 and IDs of the electric vehicles 50, and a course of operations such as payment processing, taxation processing, and charging processing managed in a list, search for a corresponding charging apparatus 40 at a time point of reception of the identification information $ID_{ev}$ from the management terminal 62, and transmit the driving permission command to only the charging apparatus 40 which has been found. In this way, it becomes unnecessary to make the charging apparatus 40 perform detecting operation of the electric vehicle 50.

The charging apparatus 40 that has received the identification information $ID_{ev}$ and the driving permission command (S134) detects the electric vehicle 50 having the identification information $ID_{ev}$ (S136), checks that the taxation processing and the charging processing are completed for the detected electric vehicle 50, and then issues the driving permission command to the electric vehicle 50 (S138). The electric vehicle 50 permits operation of the driving mechanism upon reception of the driving permission command from the charging apparatus 40 (S140). In this case, the electric vehicle 50 is configured not to permit operation of the driving mechanism even if the completion notification of taxation processing is received. Furthermore, from the viewpoint of maintaining security, a usable time of the authentic key described above is preferably limited to a predetermined time, or the usable number of times thereof is preferably limited to a predetermined number of times.

Figure 9:
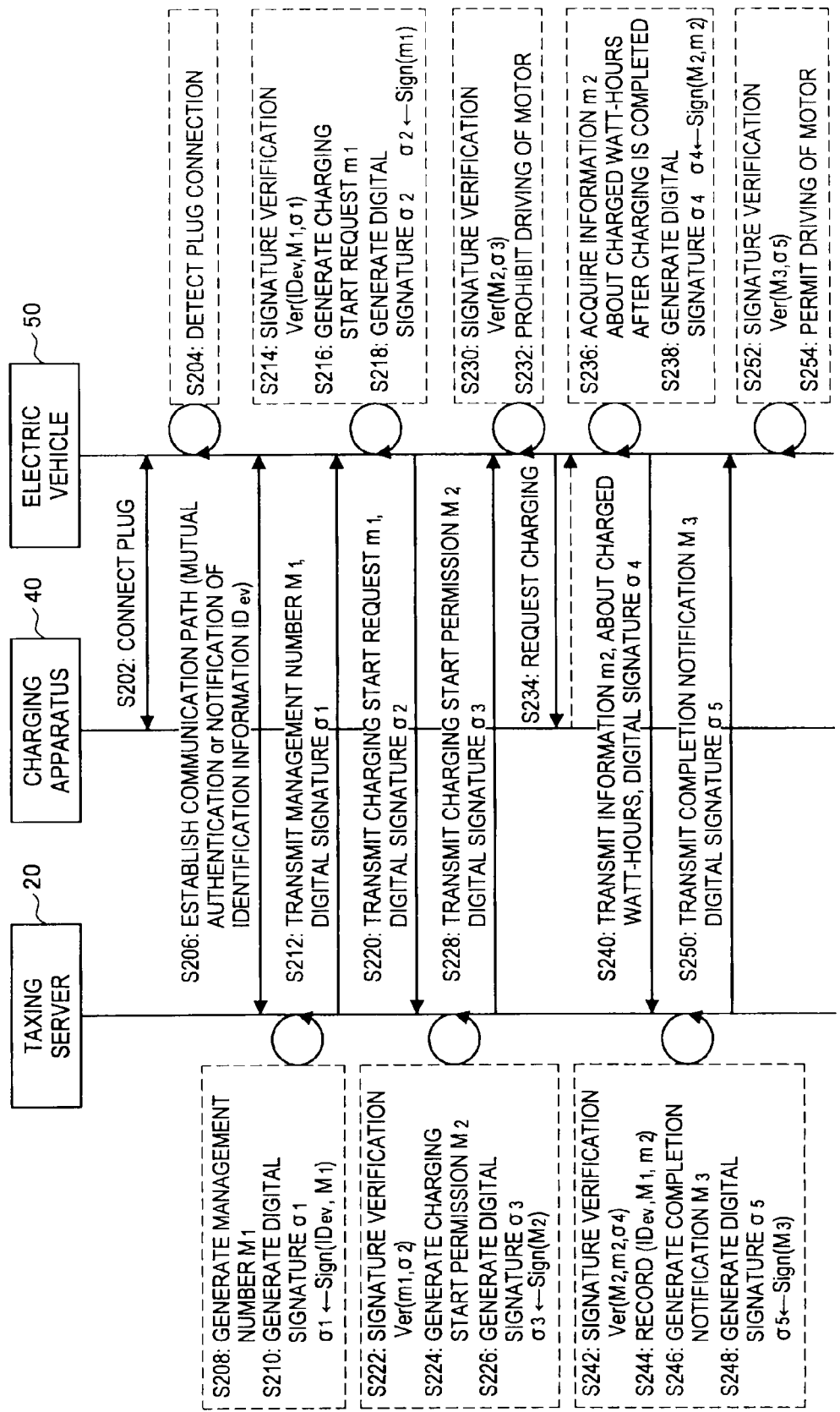
FIG. 9 is an explanatory diagram showing a drive management method of the electric vehicle, a taxation processing method, and a method of managing charging of the electric vehicle according to the embodiment.

Additionally, a configuration is also possible where the driving prohibition command and the driving permission command are not used. For example, as shown in FIG. 9, since the electric vehicle 50 transitions to a driving prohibited state at the time of start of the taxation processing, driving prohibition command processing can be omitted. On the other hand, the non-use of the driving permission command can be realized by using the completion notification of taxation processing. When the taxation processing of step S132 is completed, the taxing server 20 transmits the completion notification of taxation processing. Since the communication path passes through the management apparatus 60 and the charging apparatus 40, this completion notification is held by one of them. Then, instead of issuing the driving permission command to the electric vehicle 50, this completion notification is transmitted. This enables to omit the trouble of preparing a new command or of issuing a command separately from a notification relating to taxation processing.

In the foregoing, the drive management method according to the present embodiment has been described. Here, the mutual authentication in step S128 will be supplementarily described with reference to FIG. 8. The mutual authentication in step S128 is performed as below. Additionally, it is assumed that the charging apparatus 40 and the electric vehicle 50 hold a shared key for authentication (authentication key).

First, the charging apparatus 40 generates a random number $R_C$ (S152). Then, the charging apparatus 40 transmits the random number $R_C$ and identification information $ID_C$ to the electric vehicle 50 (S154). Then, the electric vehicle 50 generates a random number $R_{EV}$ (S156). Then, the electric vehicle 50 generates a ciphertext $E_{EV}$ using the random number $R_{EV}$, the random number $R_C$, and the identification information $ID_C$ (S158). Then, the electric vehicle 50 transmits the ciphertext $E_{EV}$ to the charging apparatus 40 (S160). Then, the charging apparatus 40 decrypts the ciphertext $E_{EV}$ received from the electric vehicle 50 (S162).

Next, the charging apparatus 40 checks whether the random number $R_C$ and the identification information $ID_C$ obtained by the decryption processing in step S162 are the same as the random number $R_C$ and the identification information $ID_C$ that the charging apparatus 40 holds (S164). In a case the check result is positive, the charging apparatus 40 generates a session key K (S166). Then, the charging apparatus 40 generates a ciphertext $E_C$ by encrypting the random numbers $R_C$ and $R_{EV}$ and the session key K (S168). Then, the charging apparatus 40 transmits the ciphertext $E_C$ to the electric vehicle 50 (S170).

Next, the electric vehicle 50 decrypts the ciphertext $E_C$ received from the charging apparatus 40 (S172). Then, the electric vehicle 50 checks whether the random numbers $R_C$ and $R_{EV}$ obtained by the decryption processing in step S172 are the same as the random numbers $R_C$ and $R_{EV}$ that the electric vehicle 50 holds (S174). In a case the check result is positive, the mutual authentication between the electric vehicle 50 and the charging apparatus 40 is successful. Then, a secure communication path based on the session key K is established between the electric vehicle 50 and the charging apparatus 40.

In the foregoing, the processing sequence of mutual authentication performed in step S126 has been described.

(Details of Taxation Processing)

Next, the taxation processing included in the driving management method according to the present embodiment performed during charging will be described in greater detail with reference to FIG. 9. FIG. 9 is an explanatory diagram showing a flow of a series of processes relating to the drive management method according to the present embodiment performed during charging. FIG. 9 is an explanatory diagram showing in detail, in particular, exchange of information relating to taxation processing performed between the electric vehicle 50 and the taxing server 20.

As shown in FIG. 9, the electric vehicle 50 is first connected to the plug of the charging apparatus 40 (S202). Next, the electric vehicle 50 detects completion of connection to the plug (S204). Next, the electric vehicle 50 establishes a communication path to the taxing server 20 via the charging apparatus 40 (S206). At this point, the electric vehicle 50 notifies the taxing server 20 of identification information $ID_{ev}$ of the electric vehicle 50, or mutual authentication is performed with the taxing server 20.

The identification information $ID_{ev}$ is ID information specific to each of the electric vehicles 50. Thus, the taxing server 20 can identify the owner (taxable person) of the electric vehicle 50 based on the identification information $ID_{ev}$. Additionally, the identification information $ID_{ev}$ may be transmitted, for example, by including a vehicle certificate, may be transmitted in a message containing the identification information $ID_{ev}$ after a digital signature being attached to the message, or may be transmitted by performing processing according to a predetermined mutual authentication protocol.

When the communication path is established between the electric vehicle 50 and the taxing server 20 through the processing in step S206, the taxing server 20 generates a management number $M_1$ (S208). The management number $M_1$ is a number used to manage information such as charged watt-hours and the tax amount notified from each of the electric vehicles 50 every time of charging. The management number $M_1$ is randomly selected or sequentially assigned while avoiding overlapping.

Next, the taxing server 20 generates a digital signature $\sigma_1$ based on the identification information $ID_{ev}$ and the management number $M_1$ (S210). For example, the taxing server 20 generates the digital signature $\sigma_1$ by inputting the identification information $ID_{ev}$ and the management number $M_1$ to a signature generation algorithm Sig that uses the secret key $sk_t$ of the taxing server 20.

Next, the taxing server 20 transmits the management number $M_1$ and the digital signature $\sigma_1$ to the electric vehicle 50 (S212). After receiving the management number $M_1$ and the digital signature $\sigma_1$ from the taxing server 20, the electric vehicle 50 verifies validity of the management number $M_1$ using the management number $M_1$, the digital signature $\sigma_1$, and the identification information $ID_{ev}$ that the electric vehicle 50 holds (S214). For example, the electric vehicle 50 verifies the signature by inputting the identification information $ID_{ev}$, the management number $M_1$, and the digital signature $\sigma_1$ to a signature verification algorithm Ver that uses the public key $pk_t$ of the taxing server 20.

If the identification information $ID_{ev}$, the management number $M_1$, and the digital signature $\sigma_1$ are accepted, the electric vehicle 50 generates a charging start request $m_1$ for receiving permission to start charging from the taxing server 20 (S216). The charging start request $m_1$ is, for example, an electronic document containing the management number $M_1$ received from the taxing server 20 and the identification information $ID_{ev}$ of the electric vehicle 50.

Next, the electric vehicle 50 generates a digital signature $\sigma_2$ based on the charging start request $m_1$ (S218). For example, the electric vehicle 50 generates the digital signature $\sigma_2$ by inputting the charging start request $m_1$ to the signature generation algorithm Sig that uses the secret key $sk_1$ of the electric vehicle 50. Next, the electric vehicle 50 transmits the charging start request $m_1$ and the digital signature $\sigma_2$ to the taxing server 20 (S220).

After receiving the charging start request $m_1$ and the digital signature $\sigma_2$ from the electric vehicle 50, the taxing server 20 verifies validity of the charging start request $m_1$ using the digital signature $\sigma_2$ (S222). For example, the taxing server 20 verifies the signature by inputting the charging start request $m_1$ and the digital signature $\sigma_2$ to the signature verification algorithm Ver that uses the public key $pk_1$ of the electric vehicle 50.

If the charging start request $m_1$ and the digital signature $\sigma_2$ are accepted, the taxing server 20 generates a charging start permission $M_2$ for permitting the start of charging (S224). The charging start permission $M_2$ is, for example, an electronic document containing the charging start request $m_1$ received from the electric vehicle 50. Next, the taxing server 20 generates a digital signature $\sigma_3$ based on the charging start permission $M_2$ (S226). For example, the taxing server 20 generates the digital signature $\sigma_3$ by inputting the charging start permission $M_2$ to the signature generation algorithm Sig that uses the secret key $sk_t$ of the taxing server 20. Next, the taxing server 20 transmits the charging start permission $M_2$ and the digital signature $\sigma_3$ to the electric vehicle 50 (S228).

After receiving the charging start permission $M_2$ and the digital signature $\sigma_3$ from the taxing server 20, the electric vehicle 50 verifies validity of the charging start permission $M_2$ using the digital signature $\sigma_3$ (S230). For example, the electric vehicle 50 verifies the signature by inputting the charging start permission $M_2$ and the digital signature $\sigma_3$ to the signature verification algorithm Ver that uses the public key $pk_t$ of the taxing server 20. If the charging start permission $M_2$ and the digital signature $\sigma_3$ are accepted, the electric vehicle 50 prohibits driving of the motor (the driving unit 512) (S232). Additionally, the electric vehicle 50 may prohibit the driving of the motor after receiving the driving prohibition command issued by the management apparatus 60 and transmitted via the charging apparatus 40.

Next, the electric vehicle 50 transmits a charging request to cause the charging apparatus 40 to start the supply of power (S234). When the charging request is received from the electric vehicle 50 and a charging permission issued by the management apparatus 60 is received, the charging apparatus 40 starts supplying power to the electric vehicle 50.

When charging is completed, the electric vehicle 50 acquires information $m_2$ about charged watt-hours (S236). For example, the electric vehicle 50 monitors the amount of stored charges of the battery 504, and calculates charged watt-hours from a difference in the amount of stored charges before and after charging. Alternatively, the electric vehicle 50 makes an inquiry about charged watt-hours to the charging apparatus 40 to acquire the information $m_2$ about charged watt-hours from the charging apparatus 40. Next, the electric vehicle 50 generates a digital signature $\sigma_4$ based on the charging start permission $M_2$ and the information $m_2$ about charged watt-hours (S238). For example, the electric vehicle 50 generates the digital signature $\sigma_4$ by inputting the charging start permission $M_2$ and the information $m_2$ about charged watt-hours to the signature generation algorithm Sig that uses the secret key $sk_1$ of the electric vehicle 50. Next, the electric vehicle 50 transmits the information $m_2$ about charged watt-hours and the digital signature $\sigma_4$ to the taxing server 20 (S240).

Additionally, in a case of a configuration where settlement of the charging fee and the tax amount is to be performed by the management apparatus 60, the electric vehicle 50 transmits the information $m_2$ about charged watt-hours to the management apparatus 60 via the charging apparatus 40. Also, in a case the charging apparatus 40 manages the charged watt-hours, the information $m_2$ about charged watt-hours is transmitted to the management apparatus 60 from the charging apparatus 40.

After receiving the information $m_2$ about charged watt-hours and the digital signature $\sigma_4$ from the electric vehicle 50, the taxing server 20 verifies validity of the information $m_2$ about charged watt-hours using the digital signature $\sigma_4$ (S242). For example, the taxing server 20 verifies the signature by inputting the information $m_2$ about charged watt-hours, the digital signature $\sigma_4$, and the charging start permission $M_2$ held by the taxing server 20 to the signature verification algorithm Ver that uses the public key $pk_1$ of the electric vehicle 50. If the charging start permission $M_2$, the information $m_2$ about charged watt-hours, and the digital signature $\sigma_4$ are accepted, the taxing server 20 associates and records the identification information $ID_{ev}$, the management number $M_1$, and the information $m_2$ about charged watt-hours (S244).

Next, the taxing server 20 generates a completion notification $M_3$ indicating completion of taxation processing (S246). The completion notification $M_3$ is, for example, an electronic document containing the information $m_2$ about charged watt-hours. Next, the taxing server 20 generates a digital signature $\sigma_5$ based on the completion notification $M_3$ (S248). For example, the taxing server 20 generates the digital signature $\sigma_5$ by inputting the completion notification $M_3$ to the signature generation algorithm Sig that uses the secret key $sk_t$ of the taxing server 20. Next, the taxing server 20 transmits the completion notification $M_3$ and the digital signature $\sigma_5$ to the electric vehicle 50 (S250).

After receiving the completion notification $M_3$ and the digital signature $\sigma_5$ from the taxing server 20, the electric vehicle 50 verifies validity of the completion notification $M_3$ using the digital signature $\sigma_5$ (S252). For example, the electric vehicle 50 verifies the signature by inputting the completion notification $M_3$ and the digital signature $\sigma_5$ to the signature verification algorithm Ver that uses the public key $pk_t$ of the taxing server 20. If the completion notification $M_3$ and the digital signature $\sigma_5$ are accepted and a driving permission issued by the management apparatus 60 is received, the electric vehicle 50 permits driving of the motor (the driving unit 512) (S254).

In this manner, the electric vehicle 50 exchanges information used for taxation with the taxing server 20 using public key signatures. Furthermore, the electric vehicle 50 prohibits operation of the motor before starting charging, and, after taxation processing is completed, permits operation of the motor. Therefore, when charging, it is difficult for the user of the electric vehicle 50 to drive the electric vehicle 50 before taxation processing is completed. As a result, an act to illegally evade taxation processing can be prevented. Furthermore, since the drive management of the electric vehicle 50 is performed in accordance with the timing of the security token 80 being brought into proximity or in contact with the reader/writer 70, it becomes possible to make the user go to the installation location of the reader/writer 70.

The configurations of the electronic documents and the digital signatures transmitted in steps S220, S228, S240, and S250 described above can be changed as appropriate within a range in which security is adequately secured. For example, the charging start request $m_1$ may contain, in addition to the identification information $ID_{ev}$ and the management number $M_1$, the digital signature $\sigma_1$. Also, the charging start permission $M_2$ may contain the digital signature $\sigma_2$. Furthermore, the digital signature $\sigma_4$ may be generated based on the information $m_2$ about charged watt-hours, the charging start permission $M_2$, and the digital signature $\sigma_3$. Also, the completion notification $M_3$ may contain, in addition to the information $m_2$ about charged watt-hours, the charging start permission $M_2$ and the digital signature $\sigma_4$. Moreover, an index number to identify each electronic document may be contained in electronic documents transmitted in steps S212, S220, S228, S240, and S250. Furthermore, data that changes with time such as a time stamp may be included in a message to prevent reuse of the electronic document used in the past.

In the foregoing, the drive management method of the electric vehicle 50 according to the present embodiment has been described. Moreover, processing of the exchange of information carried out in taxation processing according to the present embodiment has been described in detail. By adopting such configurations, taxes specific to an electric vehicle can reliably be collected without providing an outlet dedicated to charging the electric vehicle. As a result, extra burdens of cost for collecting taxes from the electric vehicle can be suppressed, contributing to widespread use of electric vehicles. Furthermore, by installing the reader/writer 70 in a store or the like, it becomes possible to make the user of the electric vehicle go into the store. As a result, it becomes possible to use the charging service for sales promotion.

(Supplemental Remarks 1)

Incidentally, the expiration date of a public key certificate used for the above authentication processing is preferably set for a legal maintenance date of the electric vehicle 50. If, for example, the electric vehicle 50 is an electric car, the legal maintenance date means the car inspection date of the electric car. However, the expiration date of a public key certificate does not have to perfectly match the legal maintenance date and, for example, extension of one month may be granted to allow for update, or the expiration date may be set prior to the legal maintenance date to warn of the approaching car inspection date at the time of using the car. Therefore, the expiration date may be set prior to or subsequent to the legal maintenance date by a predetermined number of days or time.

The issuance of public key certificates and provision thereof to the electric vehicle 50 can be performed through a network. However, in view of burdens necessary for managing issuing dates and countermeasures against illegal issuance of public key certificates, it is preferable to adopt a mechanism by which a public key certificate is reissued during car inspection. That is, by adopting a mechanism by which a public key certificate is issued during car inspection under the control of the District Land Transport Bureau, the issuance of public key certificates can be made easier and also risks involved in falsification of public key certificates or eavesdropping can be reduced.

(Supplemental Remarks 2)

Incidentally, a configuration where the identification information of the electric vehicle 50 is read from the security token 80 has been described above. The present embodiment has a feature in that the charging permission command and the driving permission command are given in accordance with the read processing of this identification information. The identification information is acquired by the management apparatus 60 via the management terminal 62. Therefore, the management apparatus 60 can grasp the parking state and the charging state of the electric vehicle 50 using the charging service. Accordingly, the inventor of the present invention has devised a configuration where a management list of the electric vehicles 50 is managed by the management apparatus 60 to efficiently manage the parking state and the charging state of the electric vehicles 50. This management list includes the identification information acquired from the security token 80. This management list also includes information about timing at which the identification information is acquired (information about the number of times indicating a first time or a second time, and the like). By making the management apparatus 60 generate such management list and by managing the management list at the management apparatus 60, provision of services according to the parking state or the charging state is enabled. Additionally, generation and management of the management list described above may be partially performed by the management terminal 62.

<2: Modification (Configuration Providing Authentication Function to Charging Facilities)>

Next, a modification of the present embodiment will be described.

In the charging system described above, public key authentication and signature processing are performed between the electric vehicle 50 and the taxing server 20. If such a system configuration is adopted, it would be unnecessary to store public key certificates in the charging apparatus 40, which makes management of public key certificates and installation of the charging apparatus 40 easier. However, it is technically possible to cause the charging apparatus 40 to hold public key certificates.

Figure 10:
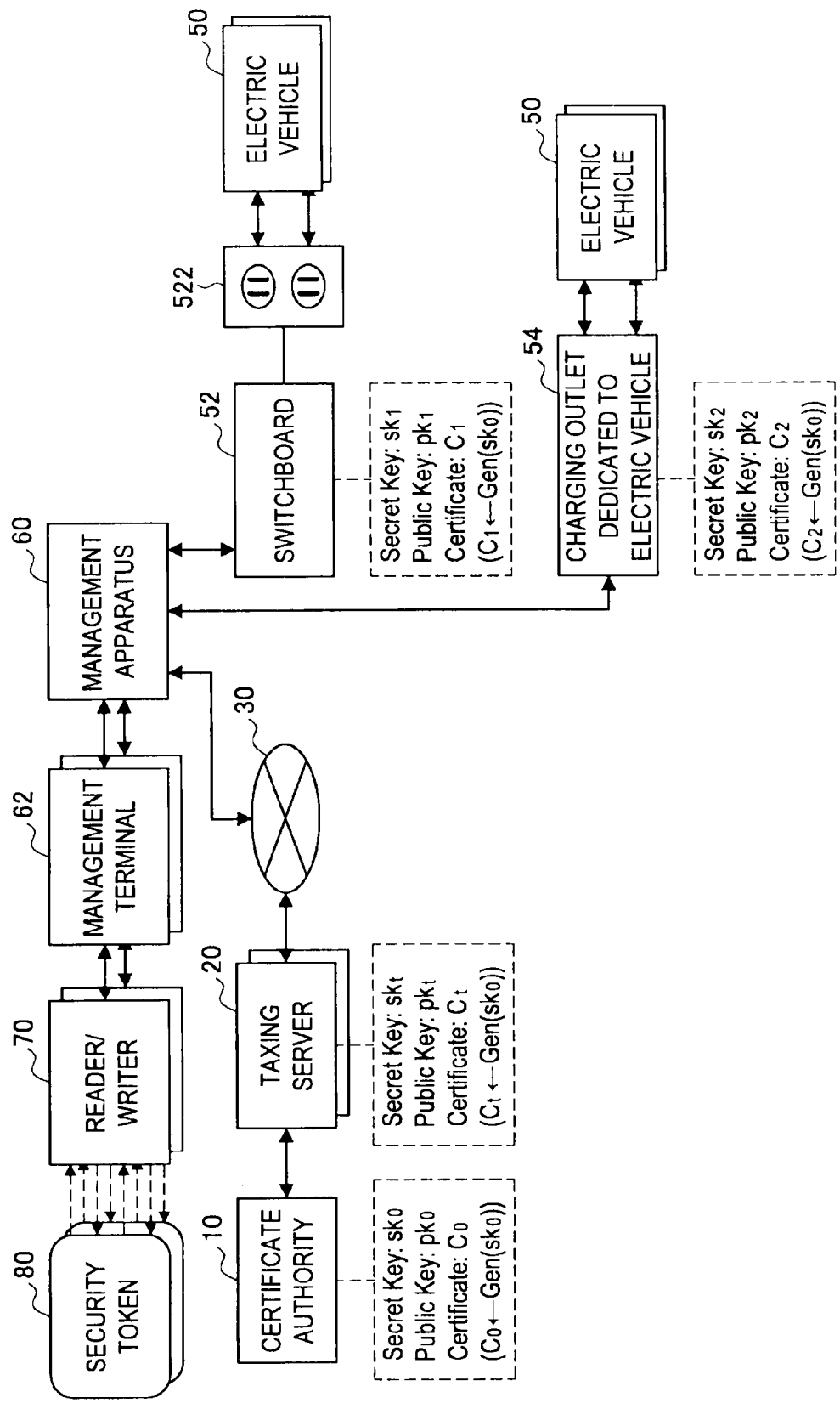
FIG. 10 is an explanatory diagram showing an example of a system configuration of a charging system according to a modification of the embodiment.

For example, as shown in FIG. 10, it is possible to separately issue a public key certificate for a switchboard 52 in ordinary households or to a charging outlet 54 dedicated to electric vehicles independent of the switchboard 52. The charging outlet 54 dedicated to electric vehicles means, for example, charging facilities that are installed in a parking lot or the like and that receive power supply from substation facilities independent of the switchboard 52. It is needless to say that the installation location and power supply source of the charging outlet 54 dedicated to electric vehicles can be changed in accordance with the usage pattern or installation environment as appropriate.

The present modification relates to a system configuration example that separately issues a public key certificate for the switchboard 52 or the charging outlet 54 dedicated to electric vehicles corresponding to the charging apparatus 40.

<2-1: System Configuration>

The system configuration of a charging system according to the present modification is basically the same as that in FIG. 1, but the charging apparatus 40 in FIG. 1 is changed to the switchboard 52 and the charging outlet 54 dedicated to electric vehicles (see FIG. 10). Moreover, the mechanism of charging is changed such that the electric vehicle 50 is connected to an outlet 522 connected to the switchboard 52 or the charging outlet 54 dedicated to electric vehicles for charging.

Figure 11:
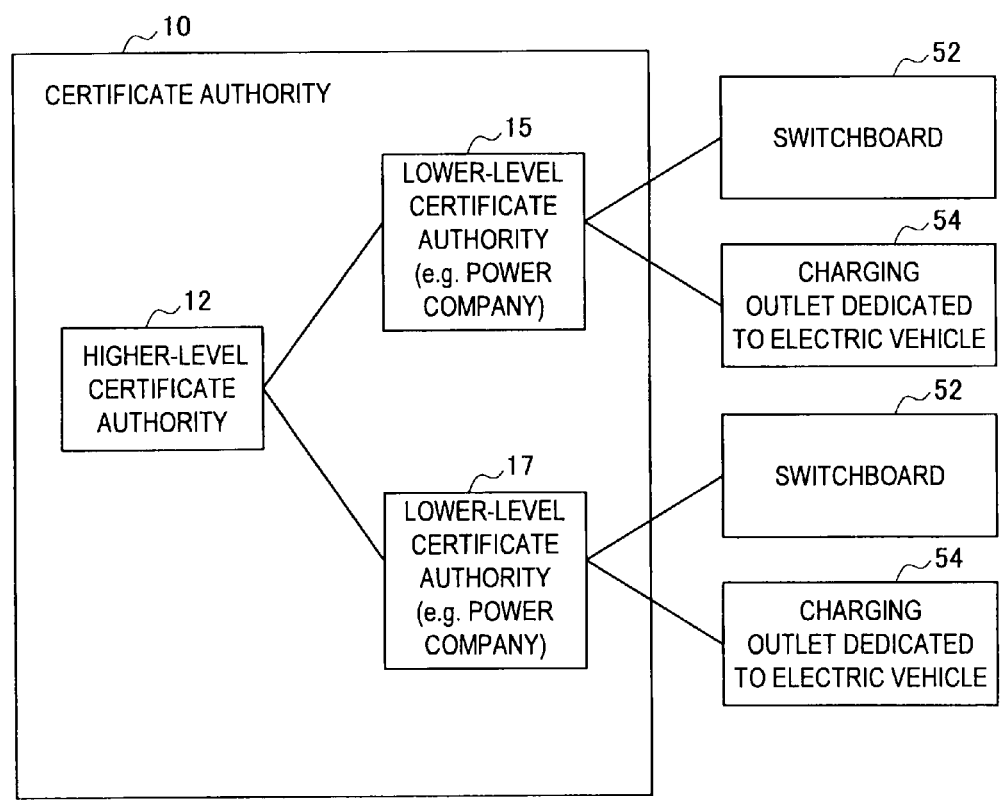
FIG. 11 is an explanatory diagram showing an example of a system configuration of the charging system according to the modification.

Then, as shown in FIG. 11, administrators of lower-level certificate authorities 15 and 17 are changed to power companies or the like. An advantage of adopting such a system configuration is to be able to recognize charging facilities from the side of the taxing server 20. For example, a public key certificate is issued to the switchboard 52 or the charging outlet 54 dedicated to electric vehicles via a contract power company. There is normally more than one outlet 522 for each of the switchboards 52 and therefore, a public key certificate may be issued for each of the outlets 522 though waste is thereby increased in terms of cost.

That is, the contract power company manages power facilities (the switchboard 52 or the charging outlet 54 dedicated to electric vehicles) of the user. In this case, ID information specific to each of the switchboard 52 and the charging outlet 54 dedicated to electric vehicles is assigned. Thus, the taxing server 20 can identify each of the switchboard 52 and the charging outlet 54 dedicated to electric vehicles. Taxation is imposed on the contractor of each of the switchboard 52 and the charging outlet 54 dedicated to electric vehicles. That is, taxation processing is performed on the ID information specific to each of the switchboard 52 and the charging outlet 54 dedicated to electric vehicles. Tax collection is executed by the contract power company or the like. A case where the drive management method during charging described above is applied to the system configuration according to the present modification will be described below.

<2-2: Drive Management Method During Charging>

Figure 12:
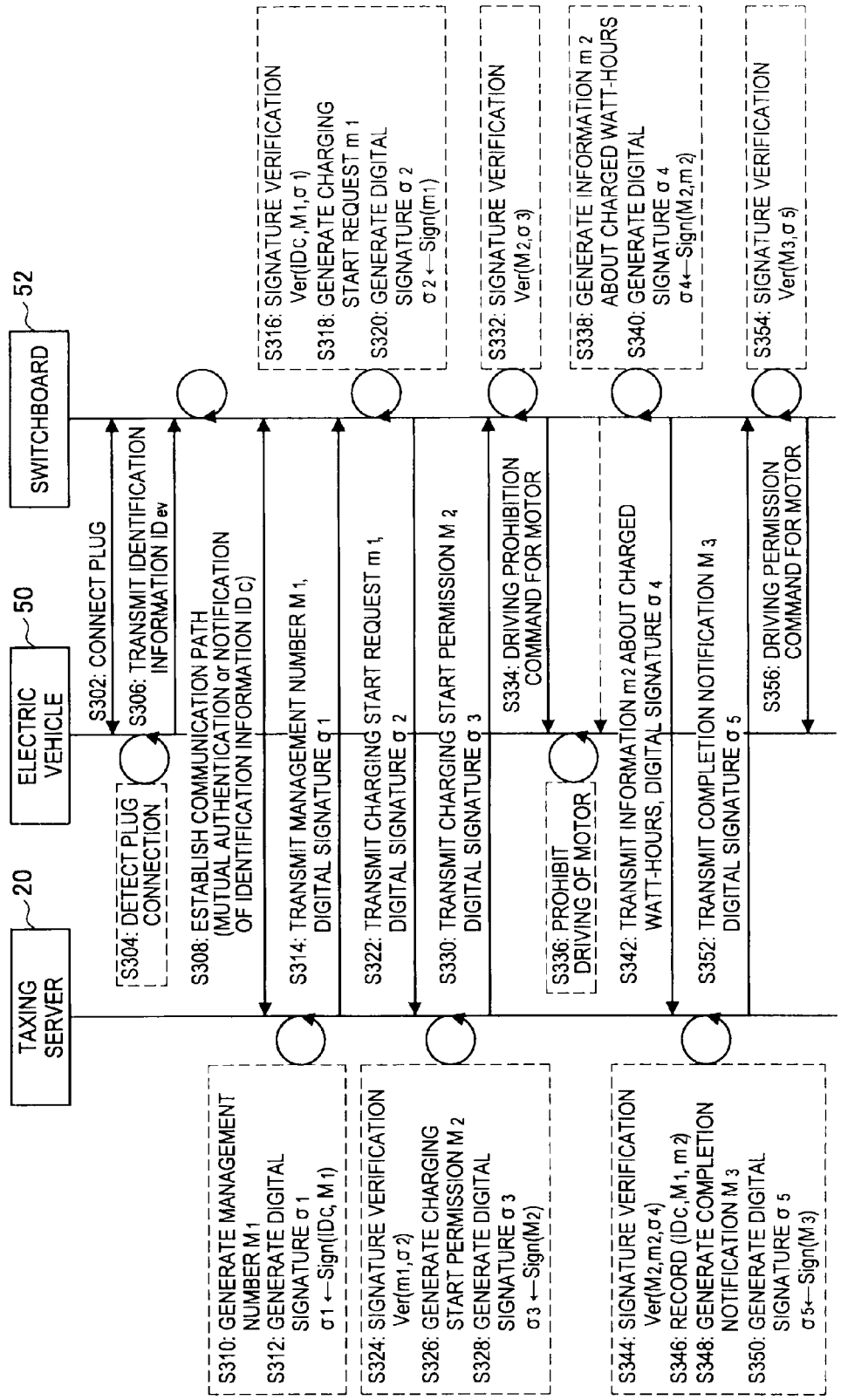
FIG. 12 is an explanatory diagram showing a drive management method of an electric vehicle, a taxation processing method, and a method of managing charging of the electric vehicle according to the modification.

The drive management method performed during charging according to the present modification will be described with reference to FIG. 12. FIG. 12 is an explanatory diagram showing a flow of a sequence of processes related to the drive management method performed during charging according to the present modification. Here, as an example, taxation processing performed between the switchboard 52 to which the electric vehicle 50 is connected and the taxing server 20 will be described. If processing by the switchboard 52 is replaced by that of the charging outlet 54 dedicated to electric vehicles, the flow of taxation processing performed between the charging outlet 54 dedicated to electric vehicles and the taxing server 20 will be obtained.

As shown in FIG. 12, the electric vehicle 50 is first connected to the outlet 522 of the switchboard 52 (S302). Next, the electric vehicle 50 detects completion of connection to the outlet 522 (S304). Next, the electric vehicle 50 transmits authentication information $ID_{ev}$ to the switchboard 52 (S306). The switchboard 52 holds the authentication information $ID_{ev}$ received from the electric vehicle 50. Thus, by holding the authentication information $ID_{ev}$ of the electric vehicle 50 in this manner, it becomes possible to identify the owner of the electric vehicle 50.

Next, the switchboard 52 establishes a communication path to the taxing server 20 (S308). At this point, the switchboard 52 notifies the taxing server 20 of identification information $ID_c$ of the switchboard 52. The identification information $ID_c$ is ID information specific to each of the switchboards 52. Thus, the taxing server 20 can identify the contractor (taxable person) of the switchboard 52 based on the identification information $ID_c$. The identification information $ID_c$ is transmitted, for example, by being included in a public key certificate issued for the switchboard 52. The identification information $ID_c$ may also be transmitted in a message containing the identification information $ID_c$ after a digital signature being attached to the message or may be transmitted by performing processing according to a predetermined mutual authentication protocol.

When the communication path is established between the switchboard 52 and the taxing server 20 by the processing in step S308, the taxing server 20 generates a management number $M_1$ (S310). The management number $M_1$ is a number used to manage information such as charged watt-hours and the tax amount notified from each of the switchboards 52 every time of charging. The management number $M_1$ is randomly selected or sequentially assigned while avoiding overlapping. Next, the taxing server 20 generates a digital signature $\sigma_1$ based on the identification information $ID_c$ and the management number $M_1$ (S312). For example, the taxing server 20 generates the digital signature $\sigma_1$ by inputting the identification information $ID_c$ and the management number $M_1$ to the signature generation algorithm Sig that uses the secret key $sk_t$ of the taxing server 20.

Next, the taxing server 20 transmits the management number $M_1$ and the digital signature $\sigma_1$ to the switchboard 52 (S314). After receiving the management number $M_1$ and the digital signature $\sigma_1$ from the taxing server 20, the switchboard 52 verifies validity of the management number $M_1$ using the management number $M_1$, the digital signature $\sigma_1$, and the identification information $ID_c$ that the switchboard 52 holds (S316). For example, the switchboard 52 verifies the signature by inputting the identification information $ID_c$, the management number $M_1$, and the digital signature $\sigma_1$ to the signature verification algorithm Ver that uses the public key $pk_t$ of the taxing server 20. If the identification information $ID_c$, the management number $M_1$, and the digital signature $\sigma_1$ are accepted, the switchboard 52 generates a charging start request $m_1$ for receiving permission to start charging from the taxing server 20 (S318). The charging start request $m_1$ is, for example, an electronic document containing the management number $M_1$ received from the taxing server 20 and the identification information $ID_c$ of the switchboard 52.

Next, the switchboard 52 generates a digital signature $\sigma_2$ based on the charging start request $m_1$ (S320). For example, the switchboard 52 generates the digital signature $\sigma_2$ by inputting the charging start request $m_1$ to the signature generation algorithm Sig that uses the secret key $sk_1$ of the switchboard 52. Next, the switchboard 52 transmits the charging start request $m_1$ and the digital signature $\sigma_2$ to the taxing server 20 (S322). After receiving the charging start request $m_1$ and the digital signature $\sigma_2$ from the switchboard 52, the taxing server 20 verifies validity of the charging start request $m_1$ using the digital signature $\sigma_2$ (S324). For example, the taxing server 20 verifies the signature by inputting the charging start request $m_1$ and the digital signature $\sigma_2$ to the signature verification algorithm Ver that uses the public key $pk_1$ of the switchboard 52.

If the charging start request $m_1$ and the digital signature $\sigma_2$ are accepted, the taxing server 20 generates a charging start permission $M_2$ for permitting the start of charging (S326). The charging start permission $M_2$ is, for example, an electronic document containing the charging start request $m_1$ received from the switchboard 52. Next, the taxing server 20 generates a digital signature $\sigma_3$ based on the charging start permission $M_2$ (S328). For example, the taxing server 20 generates the digital signature $\sigma_3$ by inputting the charging start permission $M_2$ to the signature generation algorithm Sig that uses the secret key $sk_t$ of the taxing server 20. Next, the taxing server 20 transmits the charging start permission $M_2$ and the digital signature $\sigma_3$ to the switchboard 52 (S330).

After receiving the charging start permission $M_2$ and the digital signature $\sigma_3$ from the taxing server 20, the switchboard 52 verifies validity of the charging start permission $M_2$ using the digital signature $\sigma_3$ (S332). For example, the switchboard 52 verifies the signature by inputting the charging start permission $M_2$ and the digital signature $\sigma_3$ to the signature verification algorithm Ver that uses the public key $pk_t$ of the taxing server 20. If the charging start permission $M_2$ and the digital signature $\sigma_3$ are accepted, the switchboard 52 transmits to the electric vehicle 50 a driving prohibition command to prohibit driving of the motor (S334). After receiving the driving prohibition command, the electric vehicle 50 prohibits driving of the motor (S336). After driving of the motor is prohibited, the switchboard 52 supplies power to the electric vehicle 50.

When charging is completed, the switchboard 52 generates information $m_2$ about charged watt-hours (S338). Next, the switchboard 52 generates a digital signature $\sigma_4$ based on the charging start permission $M_2$ and the information $m_2$ about charged watt-hours (S340). For example, the switchboard 52 generates the digital signature $\sigma_4$ by inputting the charging start permission $M_2$ and the information $m_2$ about charged watt-hours to the signature generation algorithm Sig that uses the secret key $sk_1$ of the switchboard 52. Next, the switchboard 52 transmits the information $m_2$ about charged watt-hours and the digital signature $\sigma_4$ to the taxing server 20 (S342). Incidentally, the information $m_2$ about charged watt-hours may be generated by the control unit 506 of the electric vehicle 50 and transmitted to the switchboard 52 via the input/output unit 502.

After receiving the information $m_2$ about charged watt-hours and the digital signature $\sigma_4$ from the switchboard 52, the taxing server 20 verifies validity of the information $m_2$ about charged watt-hours using the digital signature $\sigma_4$ (S344). For example, the taxing server 20 verifies the signature by inputting the information $m_2$ about charged watt-hours, the digital signature $\sigma_4$, and the charging start permission $M_2$ held by the taxing server 20 to the signature verification algorithm Ver that uses the public key $pk_1$ of the switchboard 52. If the charging start permission $M_2$, the information $m_2$ about charged watt-hours, and the digital signature $\sigma_4$ are accepted, the taxing server 20 associates and records the identification information $ID_c$, the management number $M_1$, and the information $m_2$ about charged watt-hours (S346).

Next, the taxing server 20 generates a completion notification $M_3$ indicating completion of taxation processing (S348). The completion notification $M_3$ is, for example, an electronic document containing the information $m_2$ about charged watt-hours. Next, the taxing server 20 generates a digital signature $\sigma_5$ based on the completion notification $M_3$ (S350). For example, the taxing server 20 generates the digital signature $\sigma_5$ by inputting the completion notification $M_3$ to the signature generation algorithm Sig that uses the secret key $sk_t$ of the taxing server 20. Next, the taxing server 20 transmits the completion notification $M_3$ and the digital signature $\sigma_5$ to the switchboard 52 (S352).

After receiving the completion notification $M_3$ and the digital signature $\sigma_5$ from the taxing server 20, the switchboard 52 verifies validity of the completion notification $M_3$ using the digital signature $\sigma_5$ (S354). For example, the switchboard 52 verifies the signature by inputting the completion notification $M_3$ and the digital signature $\sigma_5$ to the signature verification algorithm Ver that uses the public key $pk_t$ of the taxing server 20. If the completion notification $M_3$ and the digital signature $\sigma_5$ are accepted, the switchboard 52 transmits to the electric vehicle 50 a driving permission command for permitting driving of the motor (S356).

If the switchboard 52 is replaced by the charging outlet 54 dedicated to electric vehicles installed in a charging station or the like, for example, a modification may be made in such a way that a step to collect the electricity fee and tax amount from the user is inserted prior to step S356 described above and that the processing proceeds to processing in step S356 only after the collection is completed.

In this manner, the switchboard 52 exchanges information used for taxation with the taxing server 20 by using public key signatures. The switchboard 52 prohibits driving of the electric vehicle 50 before starting charging and permits driving after taxation processing is completed. Thus, the user of the electric vehicle 50 is prohibited, at the time of charging, from driving the electric vehicle 50 until taxation processing is completed. As a result, an act to illegally evade taxation processing can be prevented. Furthermore, since drive management of the electric vehicle 50 is performed in accordance with the timing of the security token 80 being brought into proximity or in contact with the reader/writer 70, it becomes possible to make the user go to the installation location of the reader/writer 70.

<3: Hardware Configuration Example>

Figure 13:
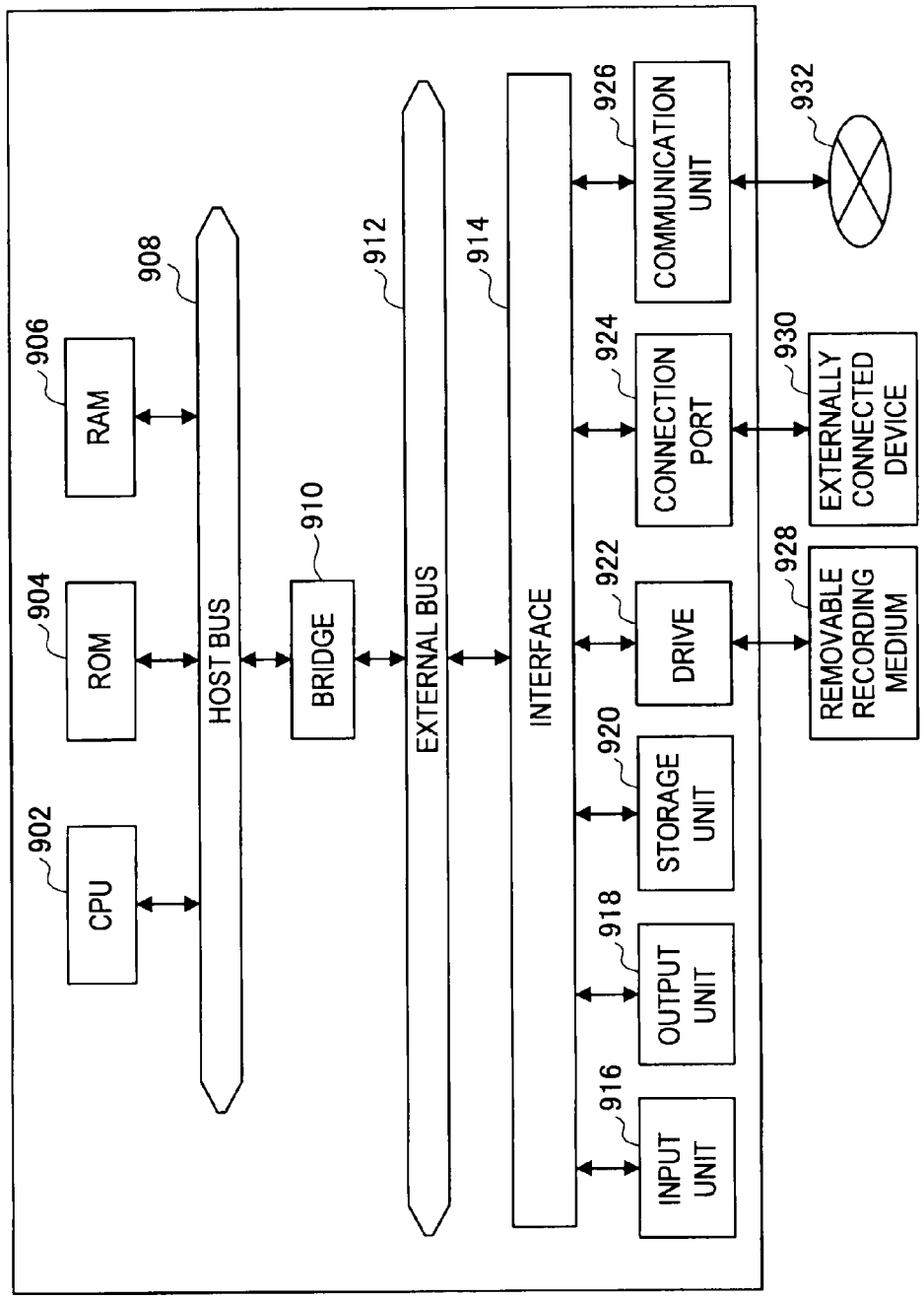
FIG. 13 is an explanatory diagram showing an example of a hardware configuration capable of performing authentication processing and signature generation/signature verification processing according to the embodiment.

The above charging management, drive management, authentication processing and signature generation processing can be realized by using, for example, the hardware configuration illustrated in FIG. 13. That is, the function of each relevant component can be realized by controlling hardware shown in FIG. 13 using a computer program.

As shown in FIG. 13, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls an entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

<4: Summary>

Lastly, technical content according to an embodiment of the present invention will be summarized. As described above, the technology according to the present embodiment is applicable to electric vehicles. Electric vehicles here include, for example, electric cars, electric bicycles, electric buses, electric freight cars, electric ships, and electric planes. Moreover, electric vehicles to which the technology according to the present embodiment is applied do not have to be intended for riding. If the technology according to the present embodiment is applied to such an electric vehicle, the configuration thereof assumes the following.

The above-described electric vehicle includes a battery that stores power, a connection unit that is to be connected a charger that communicates with a management device capable of reading identification information specific to each electric vehicle from a security token brought into proximity or in contact, a driving prohibition unit that prohibits operation of a driving mechanism in a case predetermined processing relating to charging of the battery is started after the charger is connected to the connection unit, and a driving permission unit that permits operation of the driving mechanism after the identification information of the electric vehicle is read from the security token and a driving permission for permitting operation of the driving mechanism is notified to the electric vehicle by the management device based on the identification information.

As described, with operation of the electric vehicle being prohibited until the identification information is read from the security token, the user is not allowed to move the electric vehicle without going to the installation location of information read means for the security token. Thus, the manager of the management device can lead the user to the installation location of the information read means. For example, by installing the information read means in a store, it becomes possible to lead the user into the store, thereby contributing to the sales of the store.

(Notes)

The input/output unit 502 is an example of the connection unit, the information transmission unit, and the information reception unit. The control unit 506 described above is an example of the driving prohibition unit, the driving permission unit, and the authentication processing unit. The reader/writer 70 described above is an example of the read unit. The information acquisition unit 606 described above is an example of the identification information acquisition unit. The driving permission unit 604 described above is an example of the driving permission notification unit. The charging permission unit 608 is an example of the charging permission notification unit.

It should be understood by those skilled in the art that various modifications, combinations, sub-combinations and alterations may occur depending on design requirements and other factors insofar as they are within the scope of the appended claims or the equivalents thereof.

For example, in the description of the above embodiment, it is assumed that the electric vehicle 50 and the taxing server 20 communicate via the charging apparatus 40, but the communication method is not necessarily limited to this. If, for example, the electric vehicle 50 has a wireless or wire communication function and can connect to the network 30 without the aid of the charging apparatus 40, the electric vehicle 50 may be configured to communicate with the taxing server 20 without the aid of the charging apparatus 40.

The present application contains subject matter related to that disclosed in Japanese Priority Patent Application JP 2009-285442 filed in the Japan Patent Office on Dec. 16, 2009, the entire content of which is hereby incorporated by reference.

What is claimed is:

1. An electric vehicle comprising:

a battery that stores power;

a connection unit that is to be connected to a charger, the charger configured to communicate with a management device capable of reading identification information specific to said electric vehicle based on a security token of said electric vehicle brought into proximity or in contact with a reader/writer unit associated with the management device;

a driving prohibition unit that prohibits operation of a driving mechanism in a case where predetermined processing relating to charging of the battery is started after the charger is connected to the connection unit; and a driving permission unit that permits operation of the driving mechanism after the identification information of said electric vehicle is read from the security token by the management device;

an information transmission unit that transmits, when the battery is to be charged, the identification information of said electric vehicle and information regarding charged watt-hours to a taxing server that imposes a tax amount in accordance with the charged watt-hours information; and an information reception unit that receives, from the taxing server, a completion notification of performed taxation processing based on the identification information of said electric vehicle and the information regarding charged watt-hours transmitted by the information transmission unit, wherein charging of the battery starts according to a charging permission after the identification information of said electric vehicle is read from the security token and the charging permission for permitting charging is notified based on the identification information from the management device to the charger connected to the connection unit, and wherein the driving permission unit permits operation of the driving mechanism after the completion notification is received by the information reception unit.

2. The electric vehicle according to claim 1, further comprising:

an authentication processing unit that performs, after authentication information for performing authentication processing with said electric vehicle corresponding to the identification information of said electric vehicle is read from the security token by the management device and the authentication information is provided from the management device to the charger, the authentication processing with the charger based on the authentication information, wherein the information transmission unit and the driving prohibition unit respectively start processing in a case where authentication by the authentication processing unit is successful.

3. The electric vehicle according to claim 2, wherein the security token controls a time during which reading is possible such that the authentication information is not successively read with a time interval less than a predetermined time.

* * * * *